(12) United States Patent
Yoshida et al.

(10) Patent No.: US 11,837,084 B2
(45) Date of Patent: Dec. 5, 2023

(54) TRAFFIC FLOW ESTIMATION APPARATUS, TRAFFIC FLOW ESTIMATION METHOD, TRAFFIC FLOW ESTIMATION PROGRAM, AND STORAGE MEDIUM STORING TRAFFIC FLOW ESTIMATION PROGRAM

(71) Applicant: Nippon Telegraph And Telephone Corporation, Tokyo (JP)

(72) Inventors: Manabu Yoshida, Musashino (JP); Yuki Yokohata, Musashino (JP); Kohei Mori, Musashino (JP); Takahiro Hata, Musashino (JP); Ippei Shake, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/595,379

(22) PCT Filed: May 13, 2019

(86) PCT No.: PCT/JP2019/018945
§ 371 (c)(1),
(2) Date: Nov. 15, 2021

(87) PCT Pub. No.: WO2020/230237
PCT Pub. Date: Nov. 19, 2020

(65) Prior Publication Data
US 2022/0207997 A1    Jun. 30, 2022

(51) Int. Cl.
*G08G 1/01*  (2006.01)
*G08G 1/017*  (2006.01)
*G08G 1/056*  (2006.01)

(52) U.S. Cl.
CPC ......... *G08G 1/0133* (2013.01); *G08G 1/0137* (2013.01); *G08G 1/0175* (2013.01); *G08G 1/056* (2013.01)

(58) Field of Classification Search
None
See application file for complete search history.

(56) References Cited

U.S. PATENT DOCUMENTS

| | | | | |
|---|---|---|---|---|
| 5,642,299 A | * | 6/1997 | Hardin | G01C 3/10 356/3 |
| 5,757,287 A | * | 5/1998 | Kitamura | G06T 7/248 340/936 |

(Continued)

FOREIGN PATENT DOCUMENTS

| | | | | |
|---|---|---|---|---|
| AU | 2014259162 A1 | * | 10/2015 | ............. G01D 5/353 |
| CN | 107452208 A | | 12/2017 | |

(Continued)

OTHER PUBLICATIONS

National Strategy Office of Information and Communication Technology, Cabinet Secretariat, Government of Japan "Koutsuu Deta Rikatsuyou ni Kakaru Koremade no Torikumi to Saikin no Doukou ni Tsuite (An) (Koutsuu Deta Kanrenn) (Efforts in the past and the recent trends regarding traffic data utilization (Draft) (traffic data-related))", [online], Dec. 25, 2013 Internet <URL: http://www.kantei.go.jp/jp/singi/it2/senmon_bunka/douro/dai3/sir you1.pdf>.

(Continued)

*Primary Examiner* — Fekadeselassie Girma
(74) *Attorney, Agent, or Firm* — Harness, Dickey & Pierce, P.L.C.

(57) ABSTRACT

The traffic flow estimation apparatus acquires images and position information and speed information, the images being captured at different timings by a first moving object that is in motion in a target area and including a second moving object around the first moving object, the position (Continued)

information and speed information being of the first moving object at the timings; estimates a lane in which the second moving object is in motion; and estimates a traffic flow for each lane in the target area based on the speed information of the first moving object, the information indicative of a change over time of positions of the second moving object, and the lanes in which the first moving object and the second moving object are in motion.

8 Claims, 19 Drawing Sheets

(56) References Cited

U.S. PATENT DOCUMENTS

| | | | |
|---|---|---|---|
| 5,809,161 A * | 9/1998 | Auty | G01P 3/38 |
| | | | 382/104 |
| 11,335,189 B2 * | 5/2022 | Lewis | G06N 20/00 |
| 11,341,846 B2 * | 5/2022 | Lewis | G08G 1/0129 |
| 11,410,547 B2 * | 8/2022 | Lewis | G07C 5/008 |
| 11,513,518 B2 * | 11/2022 | Caveney | G08G 1/166 |
| 2014/0358413 A1 | 12/2014 | Trombley et al. | |
| 2015/0170514 A1 | 6/2015 | Stenneth | |
| 2017/0337810 A1 * | 11/2017 | Abe | G01C 21/3492 |
| 2017/0352262 A1 | 12/2017 | Xu et al. | |
| 2018/0182238 A1 | 6/2018 | Fowe et al. | |
| 2020/0035100 A1 * | 1/2020 | Noda | G08G 1/0133 |
| 2020/0066159 A1 * | 2/2020 | Chase | B60Q 1/525 |
| 2020/0090504 A1 * | 3/2020 | Kadar | G08G 1/0141 |
| 2020/0193823 A1 * | 6/2020 | Zhang | G08G 1/09623 |
| 2021/0237776 A1 * | 8/2021 | Hashimoto | B60W 60/0059 |
| 2021/0261128 A1 * | 8/2021 | Shah | G06V 20/58 |
| 2021/0270634 A1 * | 9/2021 | Fujita | G06V 20/58 |
| 2022/0089190 A1 * | 3/2022 | Pendleton | G08G 1/04 |
| 2022/0207997 A1 * | 6/2022 | Yoshida | G08G 1/0141 |
| 2022/0299860 A1 * | 9/2022 | Wang | G06V 20/58 |
| 2022/0405947 A1 * | 12/2022 | Yang | G06V 20/54 |

FOREIGN PATENT DOCUMENTS

| | | | | |
|---|---|---|---|---|
| DE | 102005053461 B4 * | 10/2007 | | G08G 1/04 |
| JP | 2000163685 A | 6/2000 | | |
| JP | 2015076077 A | 4/2015 | | |
| JP | 2019016081 A | 1/2019 | | |

OTHER PUBLICATIONS

YOLO, Internet <URL: https://arxiv.org/abs/1804.02767>.
"Map matching algorithm", Internet <http://bin.t.u-tokyo.ac.jp/startup15/file/0529yamamoto.pdf>.
International Search Report issued in PCT/JP2019/018945, dated Aug. 13, 2019.

* cited by examiner

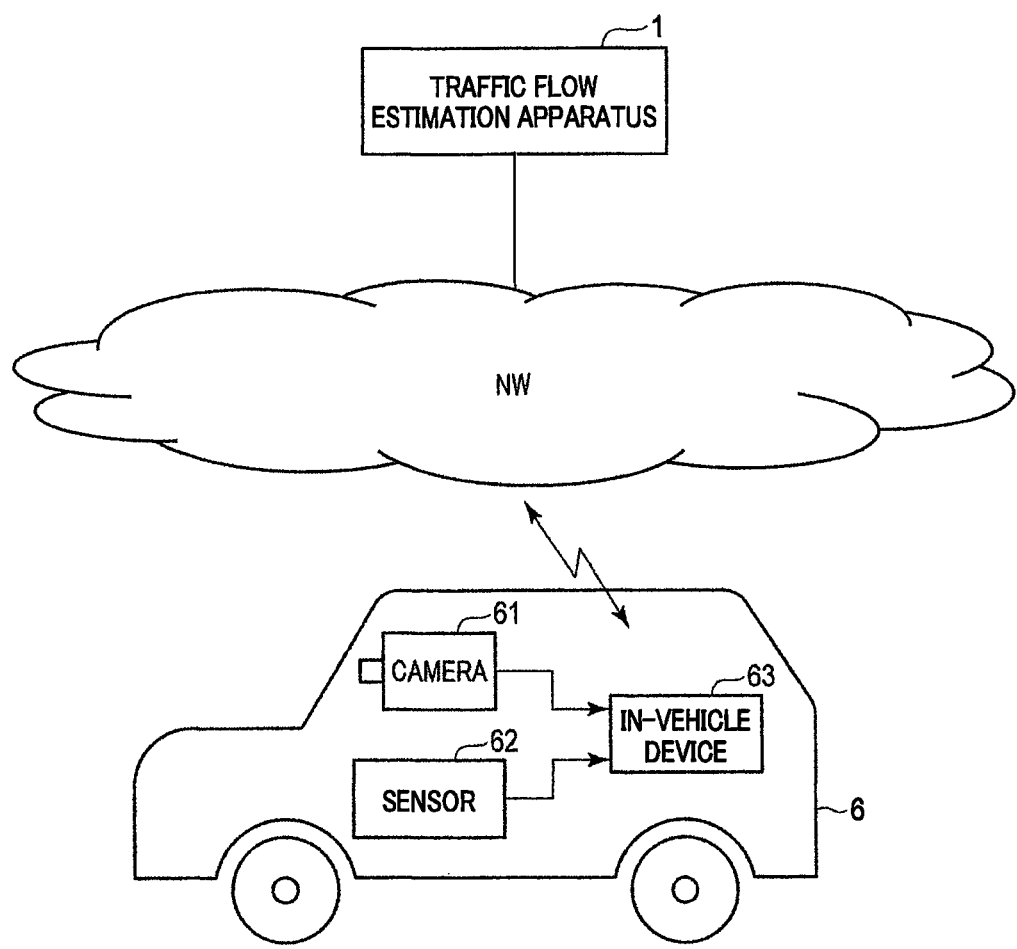
F I G. 1

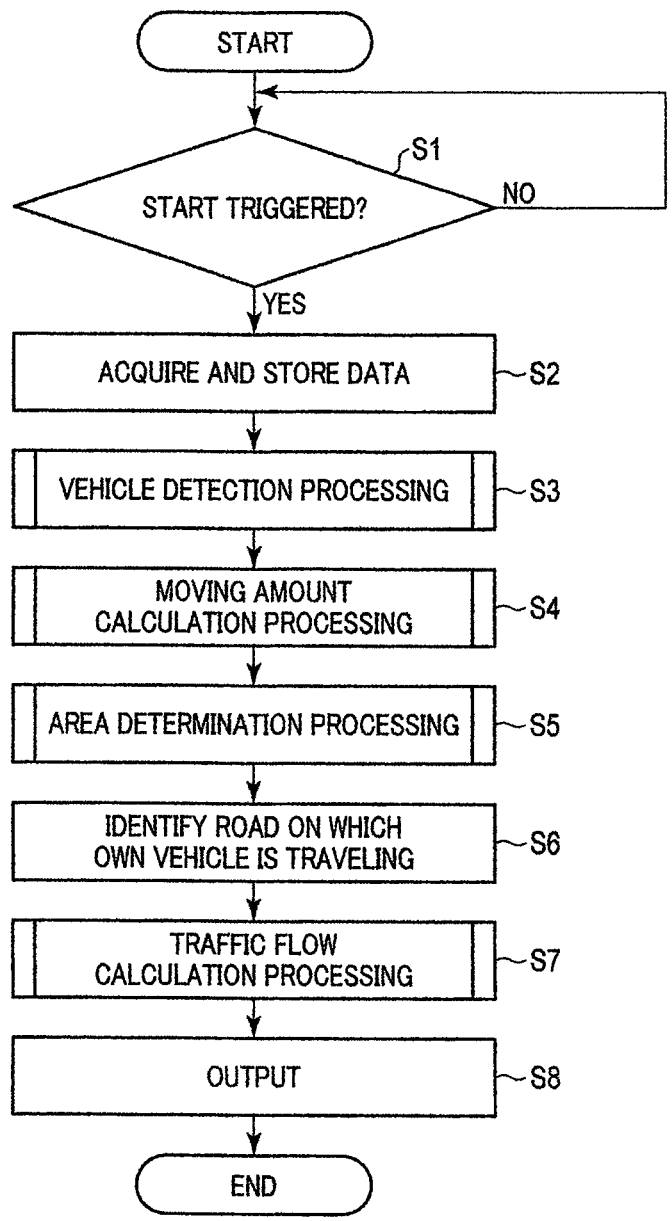
F I G. 4

| TIME | GPS (LONGITUDE AND LATITUDE) | SPEED (km/h) | ... |
|---|---|---|---|
| 2019/1/1 10:00:00 | 35.617622, 139.779567 | 35 | |
| 2019/1/1 10:00:01 | 35.617866, 139.779911 | 37 | |
| 2019/1/1 10:00:02 | 35.617971, 139.780297 | 38 | |
| 2019/1/1 10:00:03 | 35.618180, 139.780511 | 40 | |
| 2019/1/1 10:00:04 | 35.618320, 139.780597 | 41 | |
| ... | ... | ... | ... |

FIG. 6

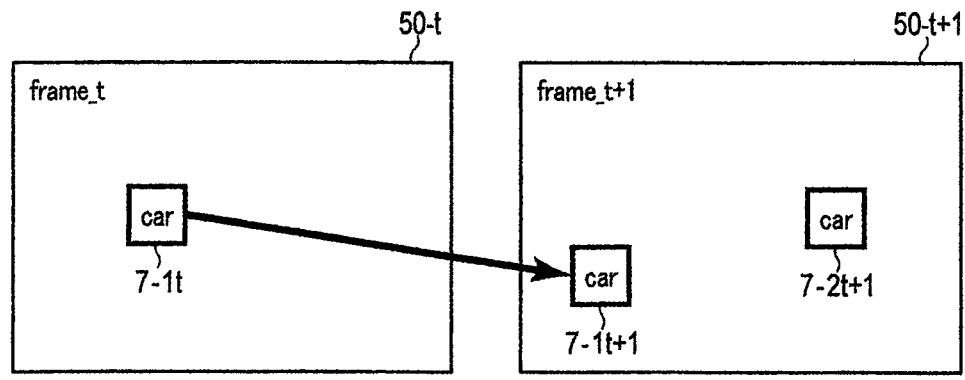
F I G. 10A
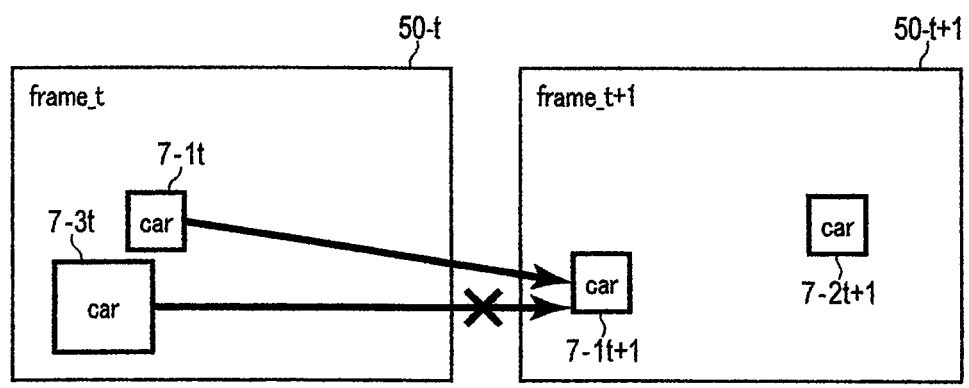
F I G. 10B

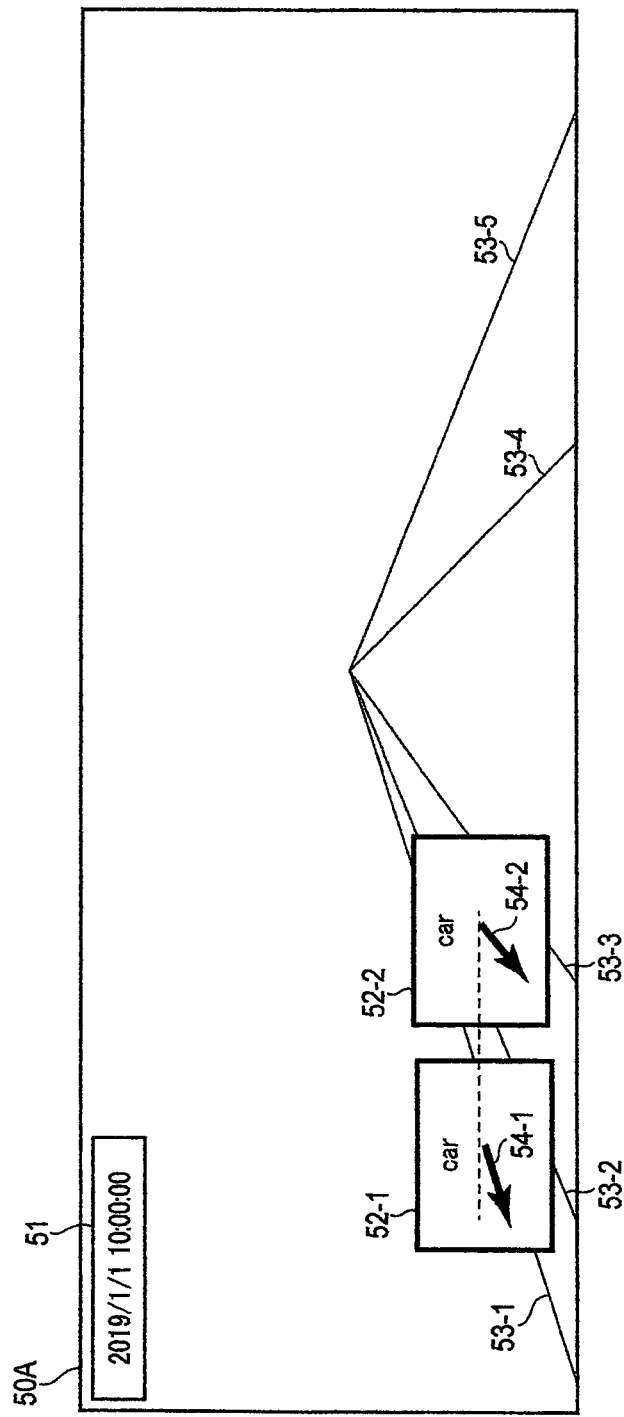

| OWN VEHICLE ID | TIME | FRAME NUMBER | ROAD WHERE OWN VEHICLE IS LOCATED | NUMBER OF LANES OF ROAD | LANE IN WHICH OWN VEHICLE IS LOCATED | TRAVELING SPEED OF OWN VEHICLE (km/h) | OTHER VEHICLE ID | MOVING AMOUNT INFORMATION OF OTHER VEHICLES | RELATIVE POSITION WHERE ANOTHER VEHICLE IS LOCATED |
|---|---|---|---|---|---|---|---|---|---|
| A | 2019/1/1 10:00:00 | 0001 | road-X | 3 LANES ON ONE SIDE | 2ND TO LEFT (ID:X2) | 35 | T1 | ·x COMPONENT DISTANCE:-40 ·y COMPONENT DISTANCE:10 ·XY COMPOSITE DISTANCE:41 | ONE LEFT (ID:X1) |
| A | 2019/1/1 10:00:00 | 0001 | road-X | 3 LANES ON ONE SIDE | 2ND TO LEFT (ID:X2) | 35 | T2 | ·x COMPONENT DISTANCE:-70 ·y COMPONENT DISTANCE:-20 ·XY COMPOSITE DISTANCE:73 | ONE RIGHT (ID:X3) |
| A | 2019/1/1 10:00:01 | 0002 | road-X | 3 LANES ON ONE SIDE | 2ND TO LEFT (ID:X2) | 30 | T1 | ·x COMPONENT DISTANCE:-50 ·y COMPONENT DISTANCE:20 ·XY COMPOSITE DISTANCE:54 | ONE LEFT (ID:X1) |
| ... | ... | ... | ... | ... | ... | ... | ... | ... | ... |

Columns grouped as: D01 (ROAD, NUMBER OF LANES, LANE, TRAVELING SPEED), D02 (OTHER VEHICLE ID, MOVING AMOUNT INFORMATION), D03 (RELATIVE POSITION).

F I G. 15

| TRAVELING SPEED OF OWN VEHICLE (km/h) | MOVING AMOUNT INFORMATION OF OTHER VEHICLE | TRAVELING SPEED OF OTHER VEHICLE (km/h) |
|---|---|---|
| 35 | • x COMPONENT DISTANCE: −40<br>• y COMPONENT DISTANCE: 10<br>• XY COMPOSITE DISTANCE: 41 | 31 |
| 35 | • x COMPONENT DISTANCE: −70<br>• y COMPONENT DISTANCE: −20<br>• XY COMPOSITE DISTANCE: 73 | 50 |
| 30 | • x COMPONENT DISTANCE: −50<br>• y COMPONENT DISTANCE: −20<br>• XY COMPOSITE DISTANCE: 54 | 38 |
| ... | ... | ... |

FIG. 18A

| TRAVELING SPEED OF OWN VEHICLE (km/h) | MOVING AMOUNT INFORMATION OF OTHER VEHICLE X COMPONENT DISTANCE | MOVING AMOUNT INFORMATION OF OTHER VEHICLE Y COMPONENT DISTANCE | MOVING AMOUNT INFORMATION OF OTHER VEHICLE XY COMPOSITE DISTANCE |
|---|---|---|---|
| 0.9 | −0.01 | −0.4 | 0.05 |

FIG. 18B

| TIME | ROAD WHERE OWN VEHICLE IS LOCATED | LANE IN WHICH VEHICLE IS LOCATED | TRAVELING SPEED OF VEHICLE (km/h) | |
|---|---|---|---|---|
| 2019/1/1 10:00:00 | road-X | X2 | 35 | ⎫ |
| 2019/1/1 10:00:00 | road-X | X2 | 35 | ⎬ R01 |
| 2019/1/1 10:00:01 | road-X | X2 | 30 | ⎭ |
| 2019/1/1 10:00:00 | road-X | X1 | 33 | ⎫ |
| 2019/1/1 10:00:00 | road-X | X3 | 40 | ⎬ R02 |
| 2019/1/1 10:00:01 | road-X | X1 | 32 | ⎭ |
| ... | ... | ... | ... | |

FIG. 19

| TIME | ROAD ID | LANE ID | AVERAGE SPEED (km/h) |
|---|---|---|---|
| 2019/1/1 10:00~10:30 | road-X | X1 | 35 |
| 2019/1/1 10:00~10:30 | road-X | X2 | 38 |
| 2019/1/1 10:00~10:30 | road-X | X3 | 45 |
| 2019/1/1 10:30~11:00 | road-X | X1 | 36 |
| 2019/1/1 10:30~11:00 | road-X | X2 | 38 |
| 2019/1/1 10:30~11:00 | road-X | X3 | 50 |
| ... | ... | ... | ... |

FIG. 20

TRAFFIC FLOW ESTIMATION APPARATUS, TRAFFIC FLOW ESTIMATION METHOD, TRAFFIC FLOW ESTIMATION PROGRAM, AND STORAGE MEDIUM STORING TRAFFIC FLOW ESTIMATION PROGRAM

CROSS REFERENCE TO RELATED APPLICATION

This application is a 371 U.S. National Phase of International Application No. PCT/JP2019/018945, filed on May 13, 2019. The entire disclosure of the above application is incorporated herein by reference.

FIELD

One aspect of the present invention relates to a traffic flow estimation apparatus, a traffic flow estimation method, a traffic flow estimation program, and a storage medium storing the traffic flow estimation program.

BACKGROUND OF THE INVENTION

In recent years, connected cars that transmit automobile vehicle data in real time to cloud environments on the Internet have been attracting attention. If a large amount of vehicle data can be collected from a plurality of connected cars, it is expected that it will be possible to grasp road conditions on streets, such as traffic congestion information, in real time, and to take early improvement of traffic conditions and proactive measures (e.g., see Non Patent Literature 1).

In addition, as vehicle data, position information can be collected together with speed and acceleration, and the observation accuracy of the position information has been improved from year to year. Thus, it is possible to identify even the lane in which an automobile is traveling, and it is also expected that the traffic situation can be grasped not only on a road basis but also on a lane basis from that information.

As an example of a method of estimating a traffic flow for each lane using vehicle data, there may be a method of identifying the lane in which a vehicle is traveling and referring to the traveling speed of the vehicle. In this way, collecting the vehicle data of a vehicle traveling in each lane on the road makes it possible to estimate the traffic flow for each lane.

CITATION LIST

Non Patent Literature 1

National Strategy Office of Information and Communication Technology, Cabinet Secretariat, Government of Japan "*Koutsuu Deta Rikatsuyou ni Kakaru Koremade no Torikumi to Saikin no Doukou ni Tsuite (An)* (*Koutsuu Deta Kanrenn*) (Efforts in the past and the recent trends regarding traffic data utilization (Draft) (traffic data-related))", [online], Dec. 25, 2013 Internet <URL: http://www.kantei.go.jp/jp/singi/it2/senmon_bunka/douro/dai3/siryou1.pdf>

SUMMARY

Technical Problem

However, not all automobiles have a function to upload vehicle data into, for example, a cloud environment, and the vehicle data collected in the cloud environment may be data unique to each automobile manufacturer, for example, so that it is difficult to collect vehicle data from all automobiles traveling in a road. Accordingly, in currently proposed systems, for example, even if vehicle data can be collected from an automobile traveling in a lane, there may occur a case where vehicle data cannot be collected from another automobile traveling in the adjacent lane, which results in a problem that the traffic flow in all lanes cannot be estimated.

The present invention has been made in view of the foregoing, and an object of the present invention is to provide a technique for estimating a traffic flow in a wider range based on limited vehicle data.

Solution to Problem

A first aspect of the present invention in order to solve the above problem is a traffic flow estimation apparatus that includes a hardware processor and a memory, wherein the memory includes a storage unit that stores lane information of a target area whose traffic flow is to be estimated, and the hardware processor is configured to perform: acquiring moving object data that includes a plurality of images and position information and speed information, the plurality of images being captured at a plurality of different timings by a first moving object that is in motion in the target area and including a second moving object around the first moving object, the position information and speed information being of the first moving object at the timings; identifying a lane in which the first moving object is in motion based on the lane information stored in the storage unit and the position information of the first moving object included in the acquired moving object data; calculating, based on the images included in the moving object data, information indicative of a change over time of positions of the second moving object in the images; detecting a positional relationship of the second moving object with respect to the first moving object from the images included in the moving object data to estimate a lane in which the second moving object is in motion based on the positional relationship and the estimated lane in which the first moving object is in motion; and estimating a traffic flow for each lane in the target area based on the speed information of the first moving object included in the moving object data, the information indicative of a change over time of positions of the second moving object, and the estimated lanes in which the first moving object and the second moving object are in motion.

In a second aspect of the present invention, calculating the information indicative of a change over time of positions of the second moving object includes determining identity among second moving objects included in the plurality of images by comparing the plurality of images.

In a third aspect of the present invention, estimating the lane in which the second moving object is in motion includes setting, in the images included in the moving object data, a lane determination line representing a lane in which the first moving object is in motion; and estimating a lane in which the second moving object is in motion based on the set lane determination line and the positional relationship of the second moving object with respect to the first moving object.

In a fourth aspect of the present invention, calculating the information indicative of a change over time of positions of the second moving object includes calculating a moving direction of the second moving object based on a change in in-image coordinates of the second moving object included in the plurality of images, and estimating a lane in which the second moving object is in motion includes estimating a lane in which the second moving object is in motion based on the calculated moving direction and the estimated lane in which the first moving object is in motion.

In a fifth aspect of the present invention, calculating the information indicative of a change over time of positions of the second moving object includes calculating a moving amount of the second moving object based on a change in in-image coordinates of the second moving object included in the plurality of images, and estimating the traffic flow includes calculating a speed of the second moving object by using a regression model in advance obtained by a regression analysis in which, based on the speed information of the first moving object included in the moving object data and the calculated moving amount of the second moving object, the speed of the first moving object and the moving amount of the second moving object are used as explanatory variables and the speed of the second moving object is used as an objective variable.

In a sixth aspect of the present invention, estimating the traffic flow includes generating traffic data in which the information indicative of a change over time of positions of the second moving object and the speed information of the first moving object are associated with each other; dividing the generated traffic data by using a predetermined reference to perform a necessary interpolation; and estimating a traffic flow of the target area based on the divided traffic data subjected to the necessary interpolation and the lane in which the first moving object is in motion.

Advantageous Effects of Invention

In the first aspect of the present invention, the traffic flow estimation apparatus stores lane information of a target area whose traffic flow is to be estimated, and acquires moving object data that includes a plurality of images and position information and speed information, the plurality of images being captured at a plurality of different timings by a first moving object that is in motion in the target area and including a second moving object around the first moving object, the position information and speed information being of the first moving object at the timings. In addition, based on the stored lane information and based on the plurality of images and the position information and speed information of the first moving object included in the acquired moving object data, the traffic flow estimation apparatus identifies a lane in which the first moving object is in motion, calculates information indicative of a change over time of positions of the second moving object, estimates a lane in which the second moving object is in motion, and estimates a traffic flow for each lane in the target area based on the estimated or calculated information.

As a result, even when vehicle data cannot be obtained from the second moving object, the traffic flow estimation apparatus can acquire the plurality of images captured by the first moving object and the position information and speed information of the first moving object at the time of capturing, and thus estimate or calculate various information including even a change over time of the positions of the second moving object and the lane in which the second moving object is in motion. This makes it possible to estimate a wider range of traffic flow without being limited to the lane in which the first moving object is in motion.

In the second aspect of the present invention, the traffic flow estimation apparatus determines identity among second moving objects by comparing the images in order to calculate the information indicative of a change over time of positions of the second moving object in the images captured by the first moving object. Thus, it is possible to obtain more accurate information based on image information including the second moving object that satisfies a predetermined identity determination criterion and thus to estimate the traffic flow more accurately.

In the third aspect of the present invention, the traffic flow estimation apparatus sets, in the images captured by the first moving object, a lane determination line representing a lane in which the first moving object is in motion, and estimates a lane in which the second moving object is in motion based on the determination line and based on the first moving object and the positional relationship of the second moving object which are detected from the images. Setting such a determination line makes it possible to more accurately estimate the lane in which the second moving object is in motion based on the relative positional relationship and thus to estimate appropriately estimate the traffic flow for each lane.

In the fourth aspect of the present invention, the traffic flow estimation apparatus calculates a moving direction of the second moving object, as the information indicative of a change over time of positions of the second moving object, based on a change in in-image coordinates of the second moving object included in the plurality of images, and estimates a lane in which the second moving object is in motion based on the calculated moving direction and the lane in which the first moving object is in motion. In this way, using a geometric method that can handle various data makes it possible to estimate a wider range of traffic flow from limited data.

In the fifth aspect of the invention, the traffic flow estimation apparatus calculates a moving amount of the second moving object, as the information indicative of a change over time of positions of the second moving object, based on a change in in-image coordinates of the second moving object. In addition, the traffic flow estimation apparatus calculates a speed of the second moving object by using a regression model in advance obtained by performing a regression analysis from the calculated moving amount of the second moving object and the speed information of the first moving object. Using such a regression model makes it possible to, based on the data obtained from the first moving object, perform parameter estimation with high reliability also for moving objects surrounding the first moving object and thus to accurately estimate a wider range of traffic flow from limited data.

In the sixth aspect of the present invention, the traffic flow estimation apparatus divides traffic data including the acquired information and the estimated or calculated information to perform a necessary interpolation, and then estimates a traffic flow. This makes it possible to estimate a wide range of traffic flow with the limited data being more effectively used.

Thus, according to each aspect of the present invention, it is possible to provide a technique for estimating a wider range of traffic flow based on limited vehicle data.

BRIEF DESCRIPTION OF THE DRAWINGS

FIG. 1 is a diagram illustrating the overall configuration of a system including a traffic flow estimation apparatus according to an embodiment of the present invention.

FIG. 4 is a flowchart illustrating processing procedure and processing content of traffic flow estimation processing performed by the traffic flow estimation apparatus illustrated in FIG. 3.

FIG. 6 illustrates an example of sensor data acquired by an in-vehicle sensor.

FIG. 10A is a diagram illustrating a first example of vehicle association between frames.

FIG. 10B is a diagram illustrating a second example of vehicle association between frames.

FIG. 14 is a diagram illustrating an example of an image of a moving direction of another vehicle detected.

FIG. 15 illustrates an example of data stored in a road-specific information storage unit.

FIG. 18A illustrates an example of training data for constructing a regression model used for processing of calculating a traveling speed of the other vehicle illustrated in FIG. 17.

FIG. 18B illustrates an example of a coefficient vector used for the processing of calculating a traveling speed of the other vehicle illustrated in FIG. 17.

FIG. 19 illustrates an example of calculation results of traveling speeds of the other vehicle associated with lane IDs.

FIG. 20 illustrates an example of data stored in a traffic flow information storage unit.

DETAILED DESCRIPTION

Figure 2:
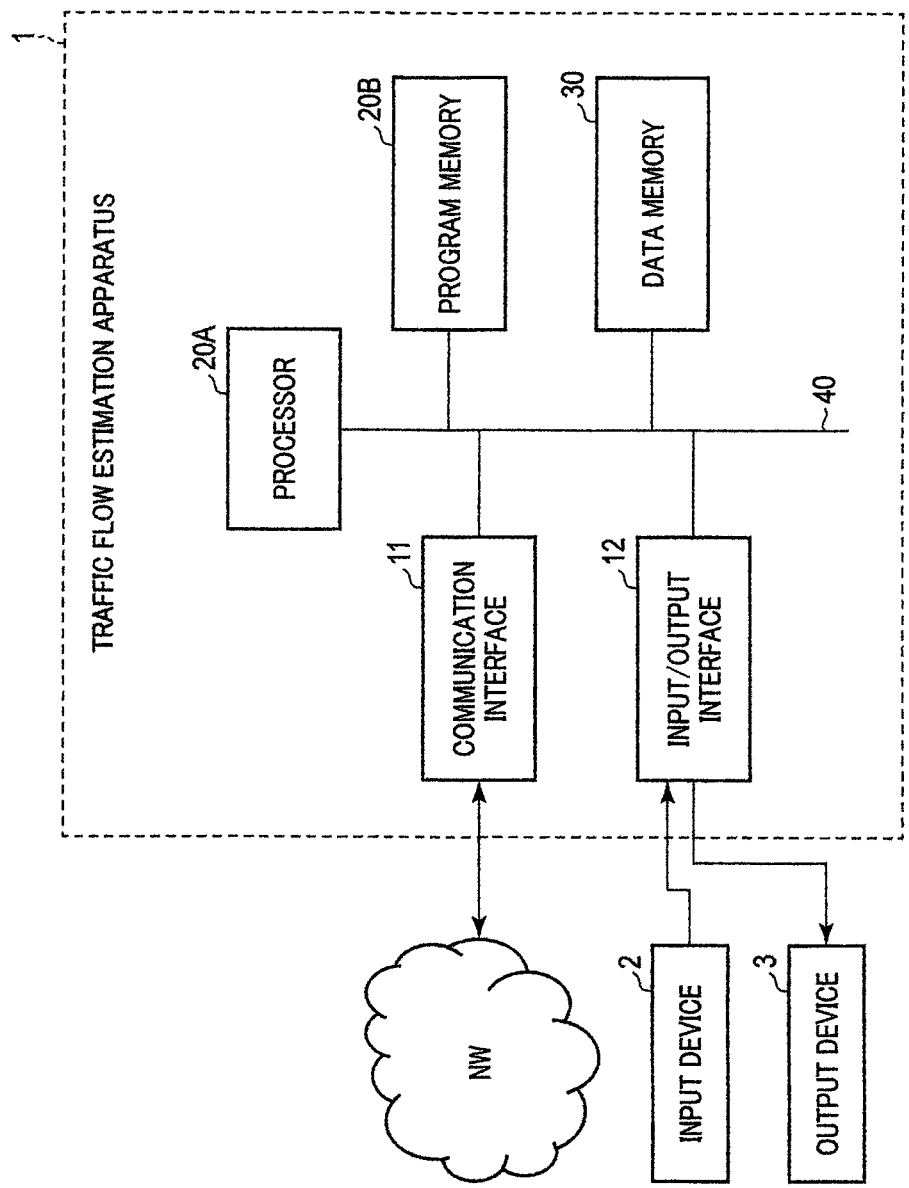
FIG. 2 is a block diagram illustrating a hardware configuration of the traffic flow estimation apparatus according to the embodiment of the present invention.

Hereinafter, embodiments according to the present invention will be described with reference to the drawings.

One Embodiment (Configuration)
(1) System

FIG. 1 is a diagram illustrating an example of the overall configuration of a system including a traffic flow estimation apparatus 1 according to an embodiment of the present invention.

This system includes the traffic flow estimation apparatus 1 on Web or cloud, for example. Also, the traffic flow estimation apparatus 1 and an in-vehicle device 63 having a communication function and mounted on a moving object 6 can communicate with each other via a communication network NW. Although only one moving object 6 is illustrated in FIG. 1 for simplicity, the traffic flow estimation apparatus 1 can communicate with a plurality of moving objects 6.

The network NW is composed of, for example, a relay network and a plurality of access networks for accessing the relay network. The relay network to be used is a closed network controlled so that it can be accessed only from a public network, such as the general Internet, or a limited number of devices. The access network to be used is, for example, a wireless LAN (Local Area Network), a mobile phone network, a wired telephone network, or the like.

In FIG. 1, an automobile is illustrated as an example of the moving object 6. The moving object 6 further includes a camera 61 and a sensor 62.

The camera 61 uses a solid-state imaging device such as a CCD (Charge Coupled Device) or CMOS (Complementary Metal Oxide Semiconductor) sensor, and is set with installation location, orientation, and angle to have a capture range including a road area in any direction such as the traveling direction of the moving object 6. The camera 61 acquires camera video data and outputs the acquired data to the in-vehicle device 63.

Note that the camera 61 may be one provided exclusively for traffic flow estimation processing, but may be any camera as long as it can obtain same type or level data, for example, a dashcam or an in-vehicle camera mounted for other purposes. For example, in a case where the moving object 6 is a motorcycle or a bicycle, a camera may be used mounted on a driver helmet or installed in a portable terminal, such as a smart phone or tablet computer, owned by a passenger of the moving object 6. Further, an infrared type of camera may be used as the camera 61. Furthermore, the data acquired by the camera 61 may be moving image (video) data or still image data captured at regular time intervals.

The sensor 62 includes a GPS sensor and a speed sensor, and may also be provided exclusively for the traffic flow estimation processing, or may be a sensor used typically for operation control or log data collection for the automobile 6, such as CAN (Controller Area Network). Further, the sensor 62 may be a mobile terminal such as a smartphone.

The GPS sensor operates to receive GPS signals transmitted from a plurality of GPS satellites and then perform range-finding calculation to calculate the latitude and longitude of the moving object 6, and outputs GPS data including the calculated latitude and longitude to an in-vehicle device VD. The GPS data can include information indicative of a reliability of GPS measurement in addition to the latitude and longitude (hereinafter, also referred to as "position information"). The reliability of GPS measurement is determined, for example, according to the arrangement of GPS satellites. Note that the acquisition of the position information is not limited to the method using signals from GPS satellites, and may use any other method, for example, using the position information of a wireless base station or a WiFi access point as long as the same function is provided.

The speed sensor is, for example, a wheel speed sensor, and is installed in a rotating portion such as a drive shaft to measure the speed of the automobile 6 based on the rotating speed of the rotating portion. The speed sensor outputs the measured speed data to the in-vehicle device 63.

The in-vehicle device 63 is, for example, a radio device mounted on an automobile dashboard, and can receive various data from the camera 61 and the sensor 62 and transmit the received data together with date and time information and the identification information of the in-vehicle device 63 (or an ETC card inserted thereinto) to the traffic flow estimation apparatus 1 via the network NW. Not that the in-vehicle device 63 is not an essential component, and the camera 61 and the sensor 62 may be configured to directly transmit data to the traffic flow estimation apparatus 1. Further, the camera 61 and the sensor 62 do not have to be separate devices, and these can be incorporated into one device or integrated into the in-vehicle device 63.

The traffic flow estimation apparatus 1 is, for example, a server apparatus installed in a traffic control center, and performs processing of estimating (calculating) a traffic flow in a target area. In the following, the "traffic flow" will be described as, but not limited to, an average speed [km/h] in a specific lane of a specific road. The traffic flow may be defined according to applications, and for example, a traffic volume indicative of the number of vehicles passing through a specific point, a traffic density, or the like may be used.

The traffic flow estimation apparatus 1 receives moving object data (hereinafter referred to as "vehicle data") including camera video data, GPS data, and speed data which are collected by the moving object 6 via the network NW, and calculates a traffic flow in the target area based on the received moving object data, for example, periodically or in response to a request from an operator or the like. Further, the traffic flow estimation apparatus 1 can output the calculated traffic flow to an external device. For example, the traffic flow estimation apparatus 1 can transmit it to the in-vehicle device 63 to notify to the driver of the moving object 6 so that it can be displayed on its own display unit, and can also transmit it to a road information display device under the control of the traffic control center so that it can be displayed.

The traffic flow estimation apparatus 1 may be configured so that, for example, the in-vehicle device 63 directly receives the vehicle data transmitted periodically or at any timing, or may be configured to access the in-vehicle device 63 to acquire necessary data.

Alternatively, the traffic flow estimation apparatus 1 may be configured to access data once transmitted from the in-vehicle device 63 to and stored in a database server (not illustrated) or the like at a timing to acquire the vehicle data, or may be configured to acquire the vehicle data stored in an external medium via an input device 2.

Note that the automobile exemplified as the moving object 6 is not limited to a specific automobile, and may be one of various automobiles for individuals, of vehicle types, and from manufacturers. In the following, the moving object 6 will be described as a vehicle 6 by way of example, but examples of the moving object 6 may include any type of moving object to be charged for the use of roads, such as an automobile, a motorcycle, a bicycle, a personal mobility, and a vehicle towed by livestock such as a carriage, or the moving object 6 may also be a pedestrian as not limited to a vehicle. Therefore, the in-vehicle device 63 illustrated in FIG. 1 is merely an example, and can be replaced with an information processing terminal such as a smart phone.

(2) Traffic Flow Estimation Apparatus
(2-1) Hardware Configuration

FIG. 2 is a block diagram illustrating an example of a hardware configuration of the traffic flow estimation apparatus 1.

The traffic flow estimation apparatus 1 is composed of, for example, a server computer or a personal computer, and includes a hardware processor 20A such as a CPU (Central Processing Unit). Also, a program memory 20B, a data memory 30, a communication interface 11, and an input/output interface 12 are connected to the hardware processor 20A via a bus 40.

The communication interface 11 includes, for example, one or more wired or wireless communication interface units, and enables information to be transmitted to and received from an external device including the in-vehicle device 63 mounted on the vehicle 6. The wired interface to be used is, for example, a wired LAN, and the wireless interface to be used is, for example, an interface that adopts a low-power wireless data communication standard such as wireless LAN or Bluetooth (registered trademark).

To the input/output interface 12, the input device 2 and an output device 3 which are attached to the traffic flow estimation apparatus 1 are connected. The input/output interface 12 performs processing of acquiring operation data input by an operator through the input device 2 such as a keyboard, touch panel, touch pad, and mouse, and also of outputting output data to the output device 3 including a display device using a liquid crystal, an organic EL (Electro Luminescence), or the like and a speaker for outputting voice. Note that as the input device 2 and the output device 3, a device or devices built in the traffic flow estimation apparatus 1 may be used, or an input device and output device of another information terminal capable of communicating via the network NW may be used.

The program memory 20B uses as a storage medium a combination of, for example, a non-volatile memory which is writable and readable at any time, such as an HDD (Hard Disk Drive) or an SSD (Solid State Drive) and a non-volatile memory such as a ROM, to store programs necessary for executing various control processing according to the embodiment.

The data memory 30 uses as a storage medium a combination of, for example, a non-volatile memory which is writable and readable at any time, such as an HDD or an SSD and a volatile memory such as a RAM (Random Access Memory), to store various data acquired and generated in the course of the traffic flow estimation processing.

(2-2) Software Configuration

Figure 3:
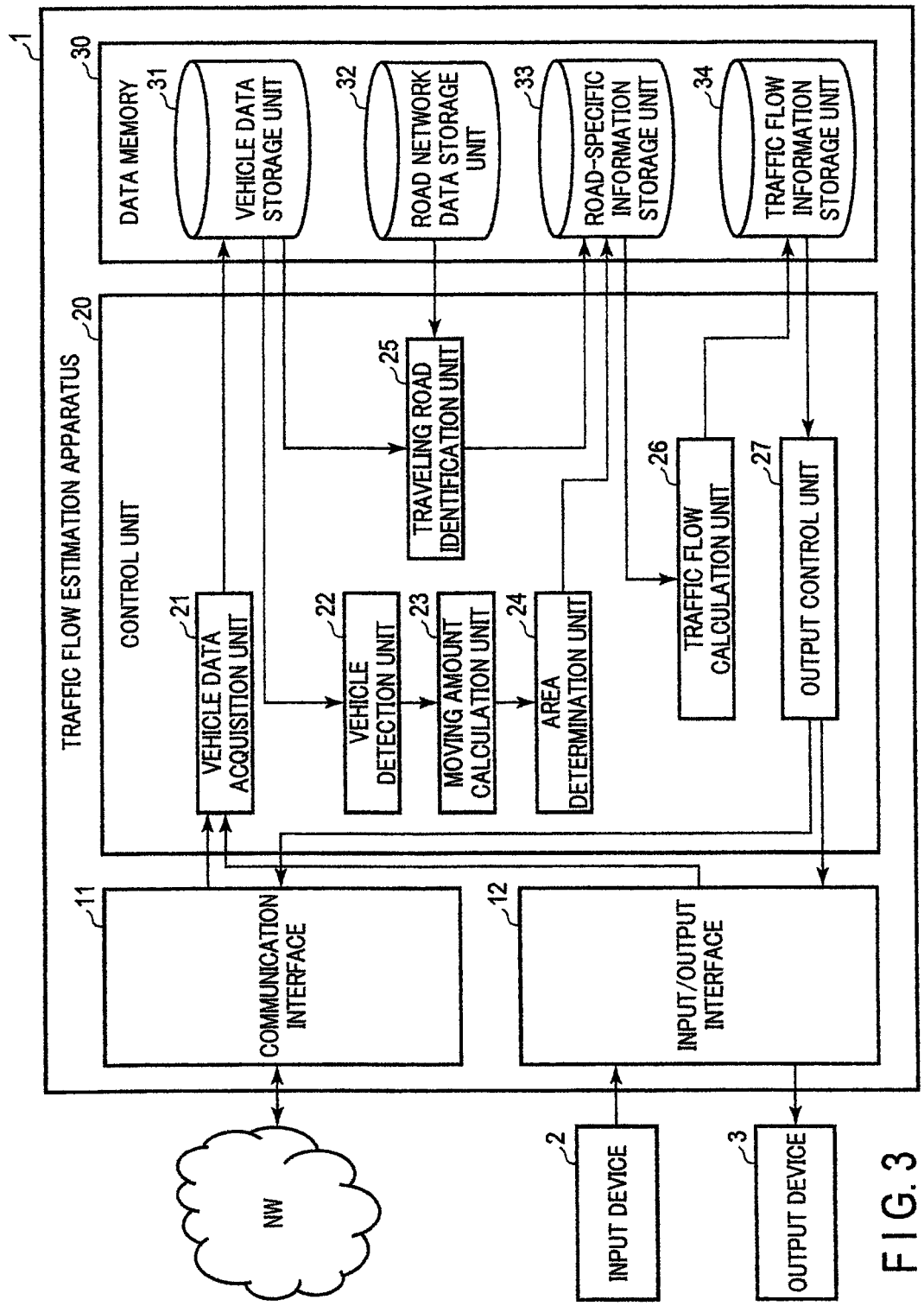
FIG. 3 is a block diagram illustrating a software configuration of the traffic flow estimation apparatus according to the embodiment of the present invention.

FIG. 3 is a block diagram illustrating a software configuration of the traffic flow estimation apparatus 1 according to the embodiment of the present invention in association with the hardware configuration illustrated in FIG. 2. A storage area of the data memory 30 includes a vehicle data storage unit 31, a road network data storage unit 32, a road-specific information storage unit 33, and a traffic flow information storage unit 34.

The vehicle data storage unit 31 is used to store vehicle data including camera image data and sensor data acquired by a vehicle data acquisition unit 21.

The road network data storage unit 32 is used to store various data related to a road network including lane information, which is stored in advance.

The road-specific information storage unit 33 is used to store various road-specific information (road-specific data) identified based on vehicle data.

The traffic flow information storage unit 34 is used to store information related to the calculated traffic flow.

Here, the storage units 31 to 34 are not essential components, and may be built in, for example, an external storage medium such as a USB memory or a storage device such as a database server deployed on cloud.

A control unit 20 is composed of the hardware processor 20A and the program memory 20B, and includes, as processing function units by software, the vehicle data acquisition unit 21, a vehicle detection unit 22, a moving amount calculation unit 23, an area determination unit 24, a traveling road identification unit 25, a traffic flow calculation unit 26, and an output control unit 27. All processing functions in these units are implemented by causing the hardware processor 20A to execute the program(s) stored in the program memory 20B. Note that these processing functions may not be implemented by using the program(s) stored in the program memory 20B, but may be implemented by using a program or programs provided through the network. The control unit 20 may also be realized in various other forms including an integrated circuit such as an ASIC (Application Specific Integrated Circuit) or an FPGA (field-programmable gate array).

The vehicle data acquisition unit 21 performs processing of acquiring the in-vehicle camera video and CAN data transmitted from the vehicle 6 via the communication interface 11 or the input/output interface 12, extracting camera video data and sensor data necessary for processing, and causing the vehicle data storage unit 31 to store the extracted data.

The vehicle detection unit 22 performs processing of reading out the camera video data stored in the vehicle data storage unit 31, cutting out the read camera video data into frames, detecting another vehicle (second moving object around) appearing in the frames, calculating the in-image coordinates of the detected other vehicle, and outputting the calculated in-image coordinates to the moving amount calculation unit 23.

The moving amount calculation unit 23 performs processing of calculating information indicative of a movement of the other vehicle (change over time of position) based on the in-image coordinates in each frame output from the vehicle detection unit 22, and outputting the information to the area determination unit 24.

The area determination unit 24 performs processing of determining, based on the information indicative of a movement of the other vehicle in each frame output from the moving amount calculation unit 23, what lane the vehicle is in (what lane the vehicle is traveling in), and outputting the determination result to the road-specific information storage unit 33 to store it.

The traveling road identification unit 25 reads out the camera video data and sensor data stored in the vehicle data storage unit 31 to determine what lane of what road the vehicle 6, which is an acquisition source of the read data (hereinafter, sometimes referred to as the "own vehicle 6"), is traveling in. The traveling road identification unit 25 also performs processing of associating information related to the traveling speed, traveling road, and traveling lane of the own vehicle 6 with the data output from the area determination unit 24, and causing the road-specific information storage unit 33 to store the resulting information.

The traffic flow calculation unit 26 performs processing of reading out the data stored in the road-specific information storage unit 33, calculating a traffic flow for each lane of each road, and then causing the traffic flow information storage unit 34 to store the calculation result.

The output control unit 27 performs processing of reading out the information stored in the traffic flow information storage unit 34, for example, periodically or in response to an output instruction from the operator, generating data for output, and outputting the generated data to the outside via the communication interface 11 or the input/output interface 12.

(Operations)

Next, information processing operations performed by the traffic flow estimation apparatus 1 configured as described above will be described. FIG. 4 is a flowchart illustrating the processing procedure and processing content.

(1) Receipt of Trigger

In the embodiment, the traffic flow estimation apparatus 1 monitors the occurrence of a trigger for starting the traffic flow estimation processing in step S1. In this state, for example, in response to receiving a trigger signal generated by an internal timer at regular intervals, or in response to receiving a trigger as a request to start the processing from the operator inputting the request using the input device 2, the traffic flow estimation apparatus 1 performs the following processing.

(2) Acquisition of Data

First, in step S2, under the control of the control unit 20, the traffic flow estimation apparatus 1 causes the vehicle data acquisition unit 21 to acquire the camera video data and sensor data via the communication interface 11 or the input/output interface 12, and causes the vehicle data storage unit 31 to store the acquired data. Here, it is assumed that the data transmitted from the in-vehicle device 63 is accumulated as a database or a file on cloud, and the traffic flow estimation apparatus 1 accesses the database or file to acquire necessary data. However, as described above, this data acquisition processing may be receiving the data directly from the in-vehicle device 63, and the vehicle data acquisition unit 21 may acquire the data transmitted to be pushed by the in-vehicle device 63 at a timing. Therefore, step S2 does not necessarily have to be performed in response to the trigger of step S1.

Further, the camera video data to be acquired by the vehicle data acquisition unit 21 will now be described as being an in-vehicle camera video captured by the in-vehicle camera 61 of the vehicle 6. Further, the in-vehicle camera 61 mounted on the vehicle 6 captures a video including the view in front of the moving vehicle 6.

Figure 5:
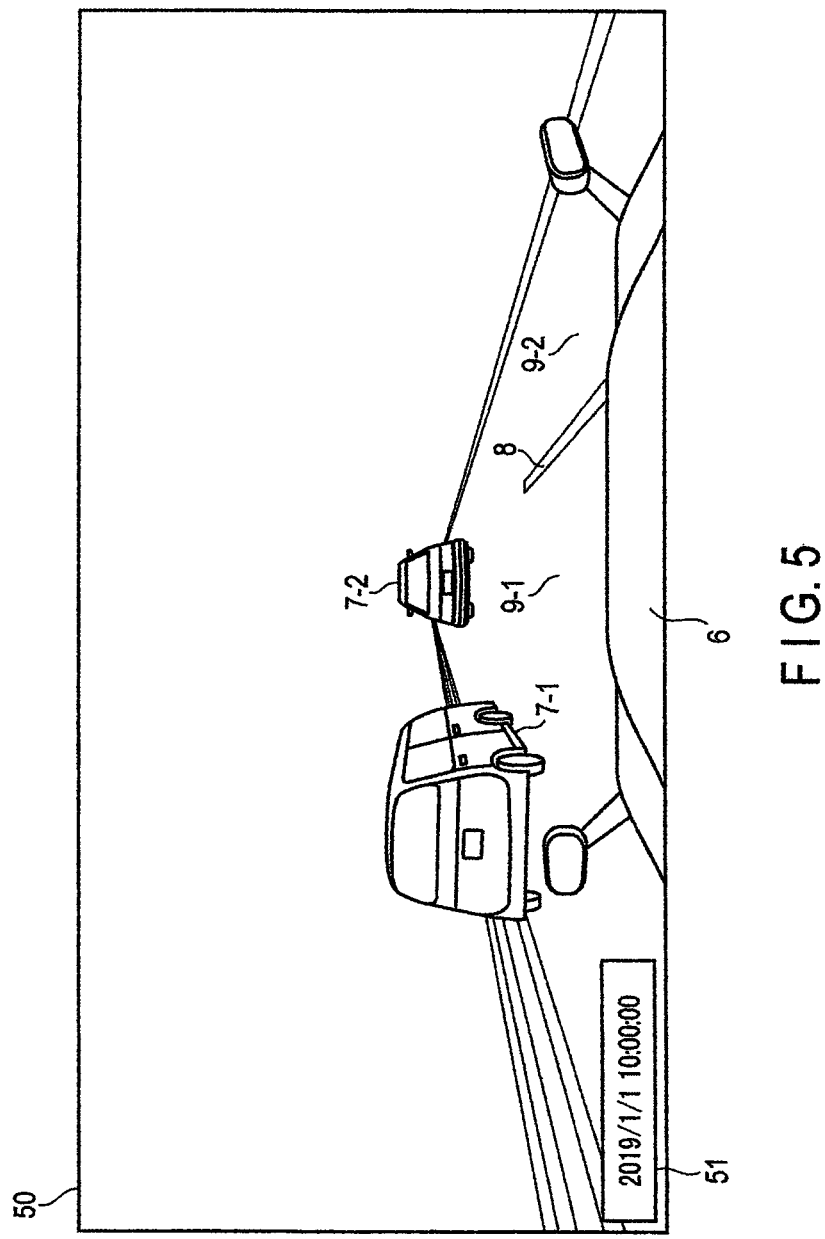
FIG. 5 is a diagram illustrating an example of an image captured by an in-vehicle camera.

FIG. 5 illustrates an example of a frame 50 cut out from camera video data acquired by the vehicle data acquisition unit 21, as an image (image data) used for the traffic flow estimation processing. The frame 50 includes date and time information 51 indicative of the date and time at which the camera 61 captured the frame 50. In the frame 50, a part of the own vehicle 6 in which the camera 61 is installed, other vehicles 7 (7-1, 7-2, . . . ) which are surrounding moving objects, a lane boundary line 8, and lanes 9 (9-1, 9-2, . . . ) appear.

Further, here, the sensor data to be acquired by the vehicle data acquisition unit 21 includes at least speed and position information of the traveling vehicle 6 measured by the sensor 62 mounted on the vehicle 6. Further, the position information is to be the latitude and longitude measured at 1 [Hz].

FIG. 6 illustrates an example of sensor data acquired by the vehicle data acquisition unit 21. The vehicle data acquisition unit 21 reads signals indicative of, for example, the position information and speed information transmitted from the sensor 62, and performs sampling on the respective signals at a sampling rate of 1 Hz, and to generate GPS [latitude and longitude] data and speed [km/h] data.

Note that the higher the frame rate [fps (frame per second)] at which camera video data is recorded, the better it is, and it is desirably 10 [fps] or more. Further, it is assumed that the time of the camera video data and the time of the sensor data (GPS data and speed data) are synchronized within an error of at least one second.

(3) Vehicle Detection Processing

Next, in step S3, under the control of the control unit 20 in the traffic flow estimation apparatus 1, the vehicle detection unit 22 performs vehicle detection processing.

Figure 7:
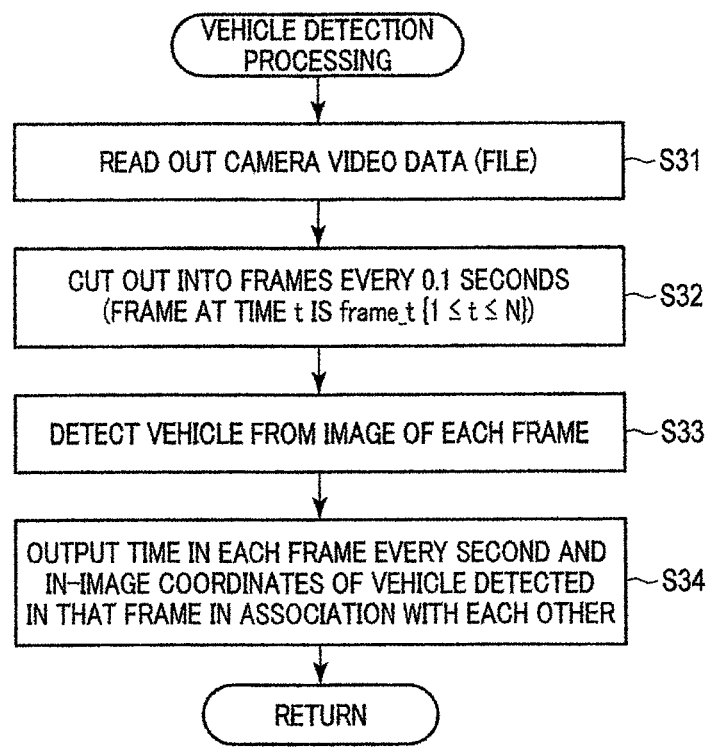
FIG. 7 is a flowchart illustrating processing procedure and processing content of vehicle detection processing of the steps of processing illustrated in FIG. 4.

FIG. 7 is a flowchart illustrating an example of processing procedure and processing content of the vehicle detection processing in step S3.

First, in step S31, the vehicle detection unit 22 reads out the camera video data (file) stored in the vehicle data storage unit 31.

Next, in step S32, the vehicle detection unit 22 performs processing of cutting out the read camera video data into frames (also referred to as "images") in units of, for example, 0.1 seconds. Here, the frame cut out at the time t is referred to as "frame_t" ($1 \leq t \leq N$) (N is an integer depending on the length of the read video data). Note that the processing of cutting out the video into frames may be performed by any method, for example, using ffmpeg.

Then, in step S33, the vehicle detection unit 22 performs processing of detecting the other vehicles 7 appearing in the image of each frame cut out. The method of detecting the other vehicles 7 may also be any method, and a method using deep learning, for example, a known YOLO (see <https://arxiv.org/abs/1804.02767> from the Internet) or the like may be used. Further, the unit for cutting out into frames may be changed depending on the frame rate at which the video is acquired.

Next, in step S34, the vehicle detection unit 22 outputs the coordinates of the detected other vehicles 7 to the moving amount calculation unit 23 in a format that the coordinates are associated with the time information of the corresponding frame. For example, in a case where the vehicle detection unit 22 performs the detection of the other vehicles 7 as a rectangle, the vehicle detection unit 22 outputs the image coordinates $\{(x1, y1), (x2, y2)\}$ of two points of the rectangle: the upper left and lower right. The origin of the coordinates is the upper left, as is typically used in the image coordinate system. Here, if a likelihood that the detection target is an automobile can be obtained in the detection of the other vehicles 7, a threshold value may be set for the likelihood so that the image coordinates $\{(x1, y1), (x2, y2)\}$ of only the detection target having the threshold value or more can be output.

Figure 8:
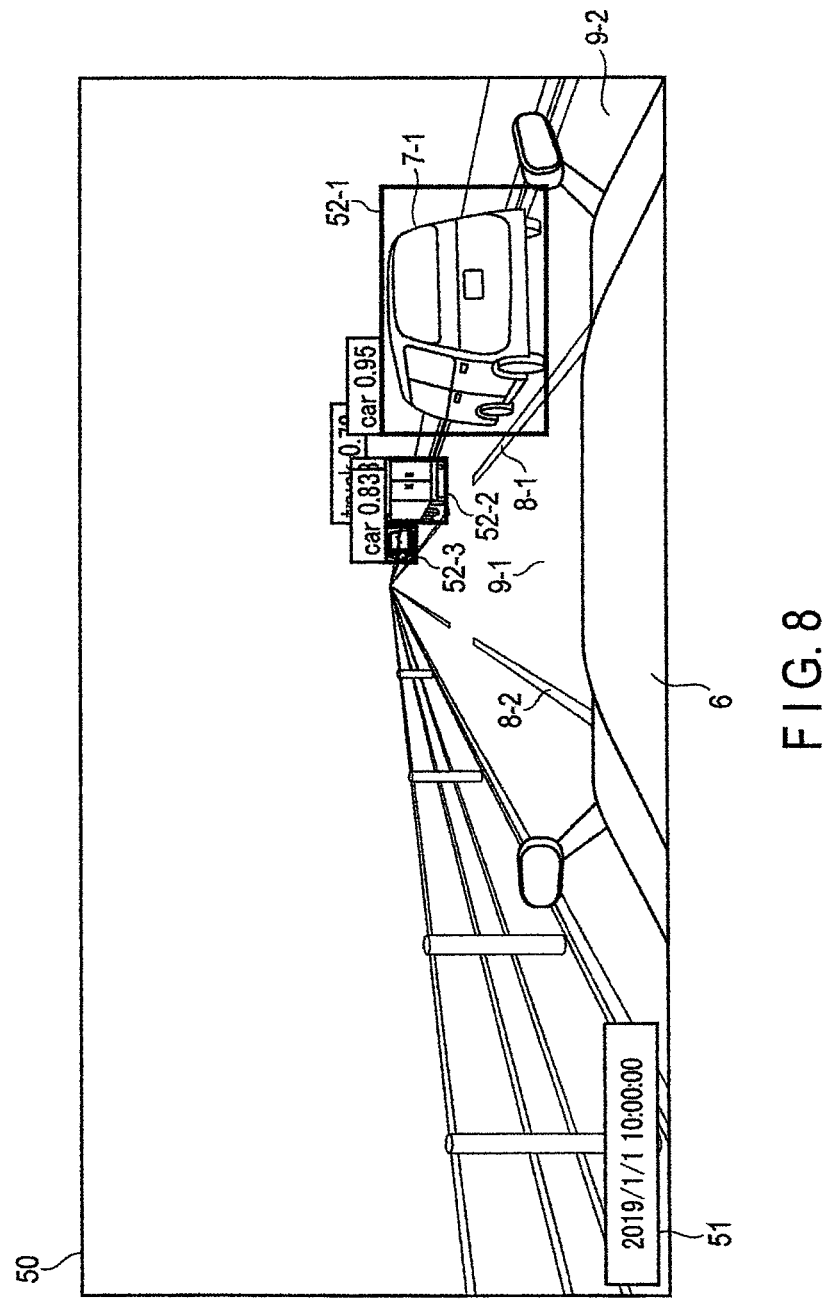
FIG. 8 is a diagram illustrating an example of a processing result of the vehicle detection processing illustrated in FIG. 7.

FIG. 8 illustrates a state where the other vehicles 7 are detected in the vehicle detection processing performed by the vehicle detection unit 22. In the frame 50, rectangles 52 (52-1, 52-2, 52-3, . . . ) representing the detected other vehicles 7 are displayed. In FIG. 8, the numerical value on the upper left of a rectangle where another vehicle 7 is detected (e.g., 0.95 for the rectangle 52-1) is a value representing the likelihood of a vehicle (car).

(4) Moving Amount Calculation Processing

Subsequently, in step S4, under the control of the control unit 20 in the traffic flow estimation apparatus 1, the moving amount calculation unit 23 performs the moving amount calculation processing.

Figure 9:
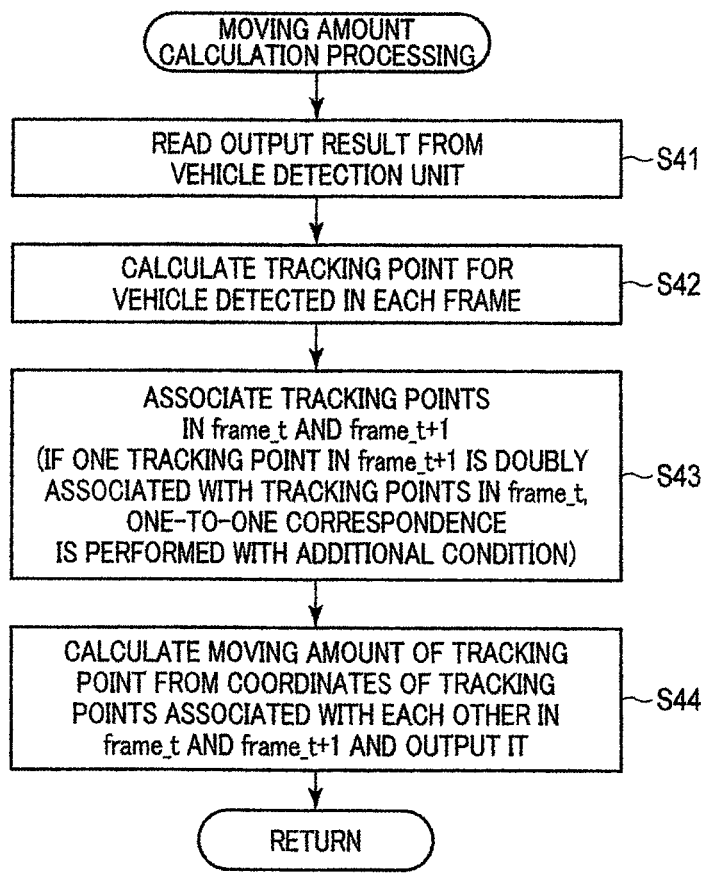
FIG. 9 is a flowchart illustrating processing procedure and processing content of moving amount calculation processing of the steps of processing illustrated in FIG. 4.

FIG. 9 is a flowchart illustrating an example of processing procedure and processing content of the moving amount calculation processing in step S4.

In step S41, the moving amount calculation unit 23 reads, as output results from the vehicle detection unit 22, the rectangular coordinates of the other vehicles 7 detected in each frame.

Next, in step S42, the moving amount calculation unit 23 calculates tracking points for the other vehicles 7 detected in each frame. Any points can be used as the tracking point. For example, the centroid (c1, c2) of the rectangular coordinates for the detected other vehicle 7 can be used. The centroid can be calculated as, for example, $c1=(x1+x2)/2$, $c2=(y1+y2)/2$, from the rectangular coordinates $\{(x1, y1), (x2, y2)\}$ of the detected other vehicle 7.

Then, in step S43, the moving amount calculation unit 23 performs processing of associating the tracking points to determine whether or not a vehicle 7 detected in a frame (frame_t+1) at time t+1 is identical to a vehicle 7 detected in a frame (frame_t) at time t. If the vehicle 7 detected in frame_t+1 is identical to the vehicle 7 detected in frame_t, a moving amount can be calculated from the difference between the tracking point coordinates of frame_t and the tracking point coordinates of frame_t+1.

First, in order to determine whether or not vehicles 7 detected in the respective frames are identical, the moving amount calculation unit 23 uses as a reference the tracking point coordinates of the vehicle 7 detected in frame_t to calculate a distance from the tracking point coordinates of the vehicle 7 detected in frame_t+1 and then associates the tracking point coordinates having the minimum distance. If a plurality of vehicles 7 are detected in frame_t+1, distances are calculated for the number of detected vehicles, and vehicles 7 having the minimum distance are associated with each other. Here, the distance may be a linear distance between the centroids (c1, c2) of the rectangular coordinates of the detected vehicles 7. Further, setting a certain threshold value for this distance also makes it possible to reduce mistakes in associating frames. Any value can be set for the certain threshold value. For example, the maximum moving distance that the vehicle 7 can move in one frame (e.g., 0.1 seconds) can be set.

FIG. 10A illustrates an example of an image of associating vehicles detected in frame_t (frame 50-$t$) and frame_t+1 (frame 50-$t$+1). In FIG. 10A, the other vehicle 7-1$t$ detected in frame_t and the other vehicle 7-1$t$+1 detected in frame_t+1 are associated with each other. Another vehicle 7-2$t$+1 is also detected in frame_t+1, but it has been determined not to be associated with any other vehicle detected in frame_t.

Next, consider a tracking point at frame_t+1 as a reference. Here, multiple association between frame_t and another frame may occur. In that case, one-to-one correspondence is performed with an additional condition. Here, the additional condition may be, for example, that detected vehicles whose areas are closest to each other are associated, or that detected vehicles whose images have the highest correlation coefficient are associated.

FIG. 10B illustrates an example of an image in a case where multiple association between frame_t and frame_t+1 occurs. In FIG. 10B, in the case where the other vehicles 7-1$t$ and t-3$t$ detected in frame_t (frame 50-$t$) are doubly associated with the other vehicle 7-1$t$+1 in frame_t+1 (frame 50-$t$+1), the association of the vehicle 7-1$t$ with the vehicle 7-1$t$+1 is selected in accordance with the condition (e.g. that detected vehicles whose areas are closest to each other are associated).

After each vehicle in a certain frame is associated with each vehicle in the next frame as described above, the moving amount calculation unit 23 calculates a moving amount of each vehicle 7 in each frame, and outputs it to the area determination unit 24 in step S44. Here, as the moving amount, a distance in the x component, a distance in the y component, a linear distance in the xy composite component, and the like in the image can be used. The rectangular coordinates {(x1, y1), (x2, y2)} of the detected vehicle 7 and the coordinates (c1, c2) used as tracking points are associated to the moving amount and output to the area determination unit 24.

Figure 11:
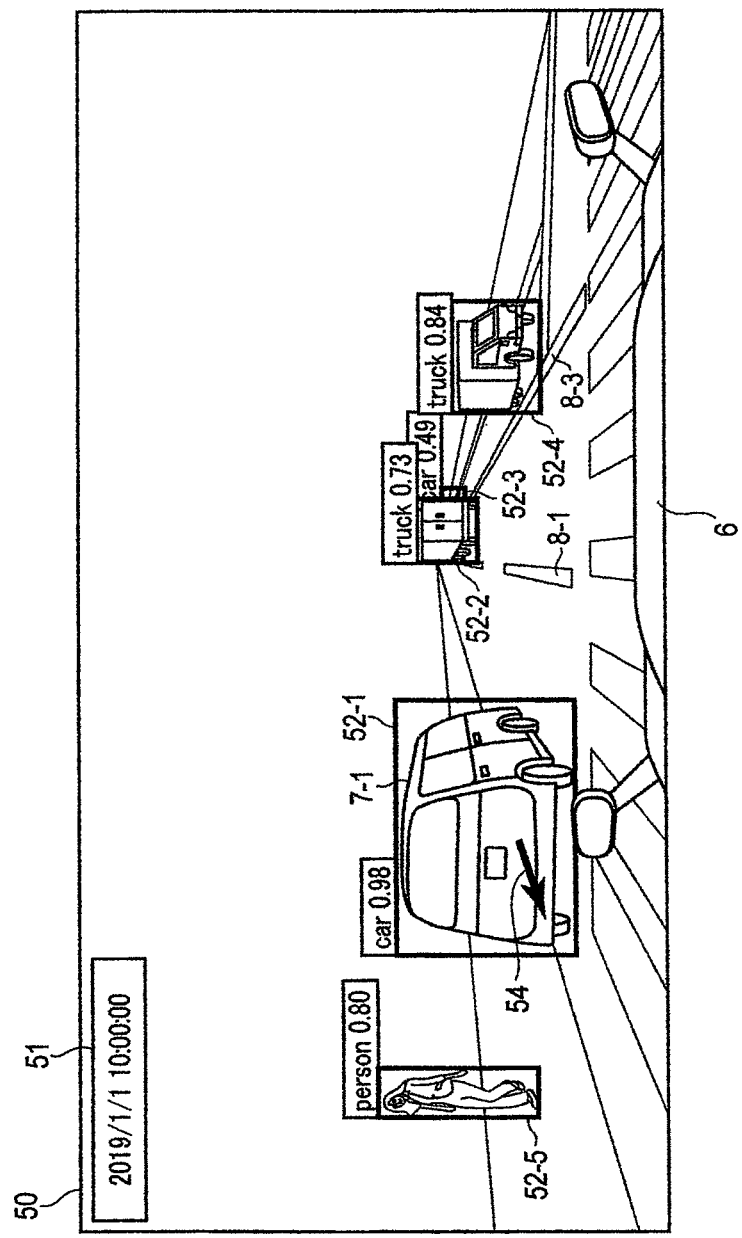
FIG. 11 is a diagram illustrating an example of a processing result of the moving amount calculation processing illustrated in FIG. 9.

FIG. 11 illustrates an example of moving amount calculation results from the moving amount calculation unit 23. If the moving amount of each vehicle in each frame can be obtained, the direction and length of the vehicle moving to the next frame can be found. In FIG. 11, the moving direction and length of the vehicle 7-1 in the frame 50 is indicated as an arrow 54. The arrow 54 is also an example of information indicative of a change over time in the position of the moving object (other vehicle 7) in the image. Note that a moving amount may also be calculated for a truck (detected as the rectangle 52-2) appearing in front of the own vehicle 6. Further, here, a person (detected as a rectangle 52-5) walking on the sidewalk is set not to be used in the moving amount calculation processing.

(5) Area Determination Processing

Next, in step S5, under the control of the control unit 20 in the traffic flow estimation apparatus 1, the area determination unit 24 performs area determination processing.

Figure 12:
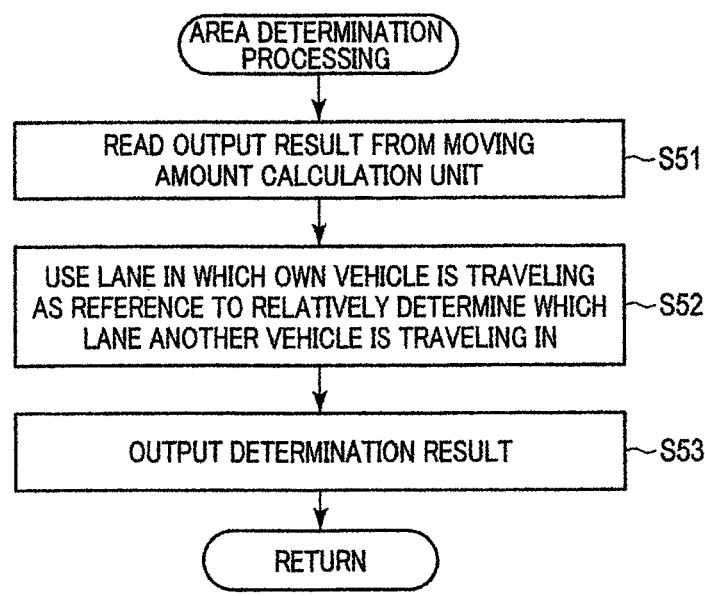
FIG. 12 is a flowchart illustrating processing procedure and processing content of area determination processing of the steps of processing illustrated in FIG. 4.

FIG. 12 is a flowchart illustrating an example of processing procedure and processing content of the area determination processing in step S5.

First, in step S51, the area determination unit 24 reads moving amount information of the other vehicles 7 in each frame 50, which is output as an output result from the moving amount calculation unit 23, and refers to the coordinates (c1, c2) as the tracking points of the other vehicles 7.

Next, in step S52, the area determination unit 24 performs processing of relatively determining which lane 9 the other vehicle 7 is traveling in from the tracking point coordinates (c1, c2).

Here, in relatively determining which lane 9 the other vehicle 7 is traveling in, the area determination unit 24 first performs processing of setting area determination lines (also referred to as lane determination lines) for both sides of the lane 9 in which the own vehicle 6 is traveling.

Figure 13:
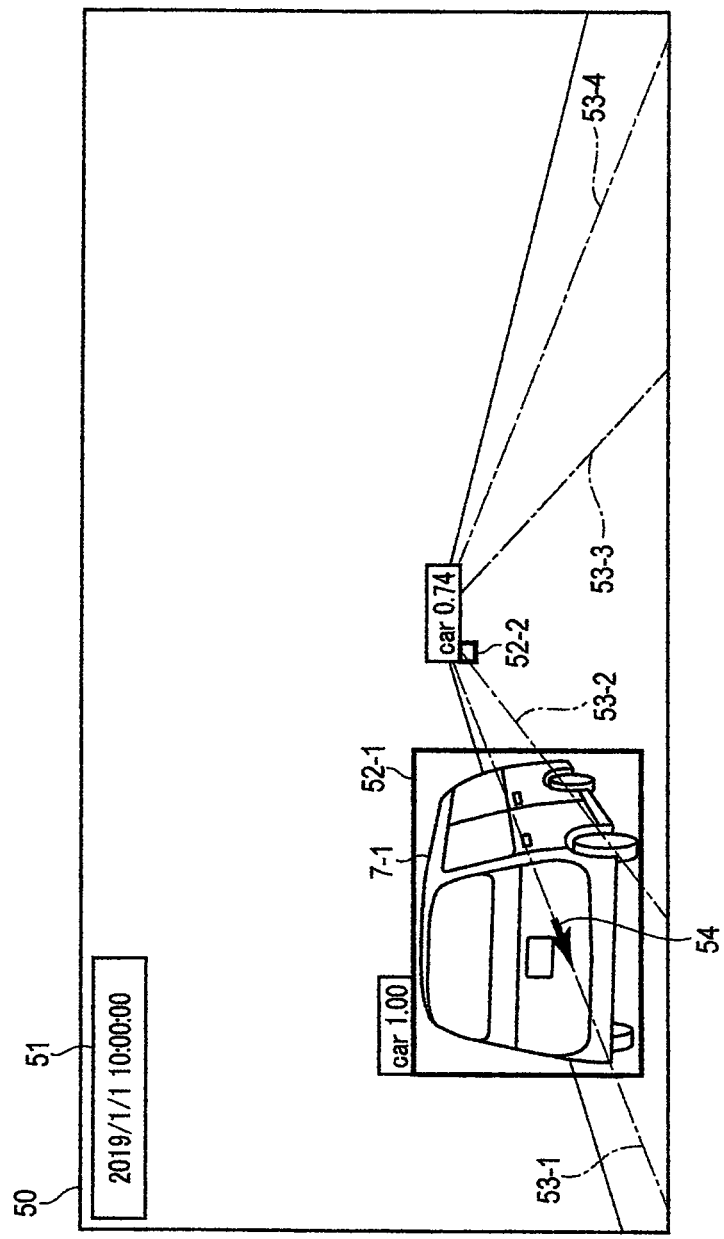
FIG. 13 is a diagram illustrating an example of area determination lines used in the area determination processing illustrated in FIG. 12.

FIG. 13 illustrates an example of an image of such area determination lines 53 (53-1, 53-2, 53-3, 53-4). On the premise that given a relatively wide road with a plurality of lanes in one direction way, the road width of each lane is generally constant, the area determination unit 24 can set a rule-based area determination lines 53 to determine which area the tracking point coordinates of the other vehicle 7 are in.

The area determination lines 53 may be defined as lines defining the width of the adjacent lane. Based on this rule, it is possible to determine the area of the lane in which the own vehicle 6 is traveling and the areas of other lanes such as {same lane/one left lane/one right lane/two or more lane to the left/two or more lane to the right}. On a computer, where the tracking point coordinates (c1, c2) are located with respect to the area determination lines 53 can be determined by using, for example, the characteristics of outer product. Specifically, as an example, the area determination unit 24 regards each of the area determination lines 53 as a vector, generates a vector from the in-image cut point coordinates of the area determination line 53 and the tracking point coordinates (c1, c2), and determines whether or not the angle formed by the two vectors is within 180 degrees by using the characteristics of outer product, so that it is possible to determine which area the tracking point coordinates (c1, c2) are located with respect to the area determination property.

However, the method of area determination performed by the area determination unit 24 is not limited to the method using the area determination lines 53 described above. For example, the area determination unit 24 can calculate the moving direction of the vehicle 7 in the image (the moving direction of the other vehicle 7-1 in FIG. 13 (inclination of the arrow 54)) from {distance in x component, distance in y component} of the moving amount calculated by the moving amount calculation unit 23. There is exhibited characteristics that as the other vehicle is traveling in a lane farther from the own vehicle, the moving direction (inclination of the arrow 54) becomes closer to being horizontal with respect to the image.

FIG. 14 is a diagram illustrating an example of an image in which as a vehicle is traveling in a lane farther from the own vehicle, the inclination of the arrow 54 becomes closer to being horizontal. As seen from FIG. 14, an arrow 54-1 of the vehicle detected in the rectangle 52-1 farther from the own vehicle is closer to being horizontal as compared with an arrow 54-2 of the vehicle detected in the rectangle 52-2 closer to the own vehicle (a dashed line is drawn to clearly show the inclination of the arrow 54).

By utilizing such characteristics, the area determination unit 24 can determine the area of the lane in which the own vehicle is traveling and the areas of other lanes such as {same lane/one left lane/one right lane/two or more lane to the left/two or more lane to the right}. In the method using the area determination lines 53 described above, it may be necessary to change the method of defining the area determination lines 53 depending on the image size and angle of view of the in-vehicle camera 61. On the other hand, using the moving direction of another vehicle 7 (inclination of the arrow 54) makes it possible to obtain the relative positional relationship with the own vehicle 6 (this will be further described later).

In step S53, the area determination unit 24 outputs the determination result to the road-specific information storage unit 33 to store it.

(6) Identification of Traveling Road

In step S6, under the control of the control unit 20 in the traffic flow estimation apparatus 1, the traveling road identification unit 25 performs processing of identifying the road on which the own vehicle 6 is traveling. More specifically, the traveling road identification unit 25 reads out the camera video data and sensor data stored in the vehicle data storage unit 31, determines which lane of which road the own vehicle 6 is traveling in, and then causes the road-specific information storage unit 33 to store information related to the traveling speed, traveling road, and traveling lane.

In the embodiment, the traveling road identification unit 25 can perform map matching processing using the position information (latitude and longitude) included in the sensor data, and the road network data stored in advance in the road network data storage unit 32. The map matching is processing of associating a vehicle with a road ID defined in road network data based on the position information of the vehicle (e.g., <http://bin.t.u-tokyo.ac.jp/startup15/file/0529yamamoto.pdf> from the Internet).

In the road network data storage unit 32, latitude and longitude of each of the start point and end point of a road are defined as the road network data for each road ID, and information on the number of lanes of the road is also stored in association with the latitude and longitude. As a specific method of map matching, a known method can be used. For example, a method of associating the road ID of a road having the minimum distance drawn from the position of the vehicle to the road can be used.

After the road on which the own vehicle is located can be identified, the traveling road identification unit 25 identifies which lane of the road the own vehicle is traveling in. As a method for identifying the traveling lane position, a known method can be used. For example, the traveling road identification unit 25 may detect the lane appearing in the image of the in-vehicle camera 61 and then identify the lane position. As an example, the traveling road identification unit 25 can determine, for example, which lane the own vehicle is traveling in from the left by detecting the area determination lines 53 illustrated in FIG. 13.

The traveling road identification unit 25 causes the road-specific information storage unit 33 to store information related to {time, road on which own vehicle is located, the number of lanes of the road, lane in which the own vehicle is located, traveling speed of the own vehicle} identified as described above.

FIG. 15 illustrates an example of an image of road-specific data stored in the road-specific information storage unit 33. The road-specific data stored in the road-specific information storage unit 33 is stored in a format in which information output from the area determination unit 24 {time, frame number, other vehicle ID, moving amount information of the other vehicle, relative position where other vehicle is located} and information output from the traveling road identification unit 25 {time, frame number, own vehicle ID, road on which the own vehicle is located, the number of lanes on the road, lane in which the own vehicle is located, traveling speed of the own vehicle} are associated with each other.

In the example of FIG. 15, the road-specific data includes information D01 {road on which the own vehicle is located, the number of lanes on the road, lane in which the own vehicle is located, traveling speed (km/h) of the own vehicle} identified by the traveling road identification unit 25; information D02 {other vehicle ID, moving amount information of the other vehicle} identified by the moving amount calculation unit 23; and information D03 {relative position in which another vehicle is located} identified by the area determination unit 24, which are all associated with the own vehicle ID, time, and frame number.

Figure 16:
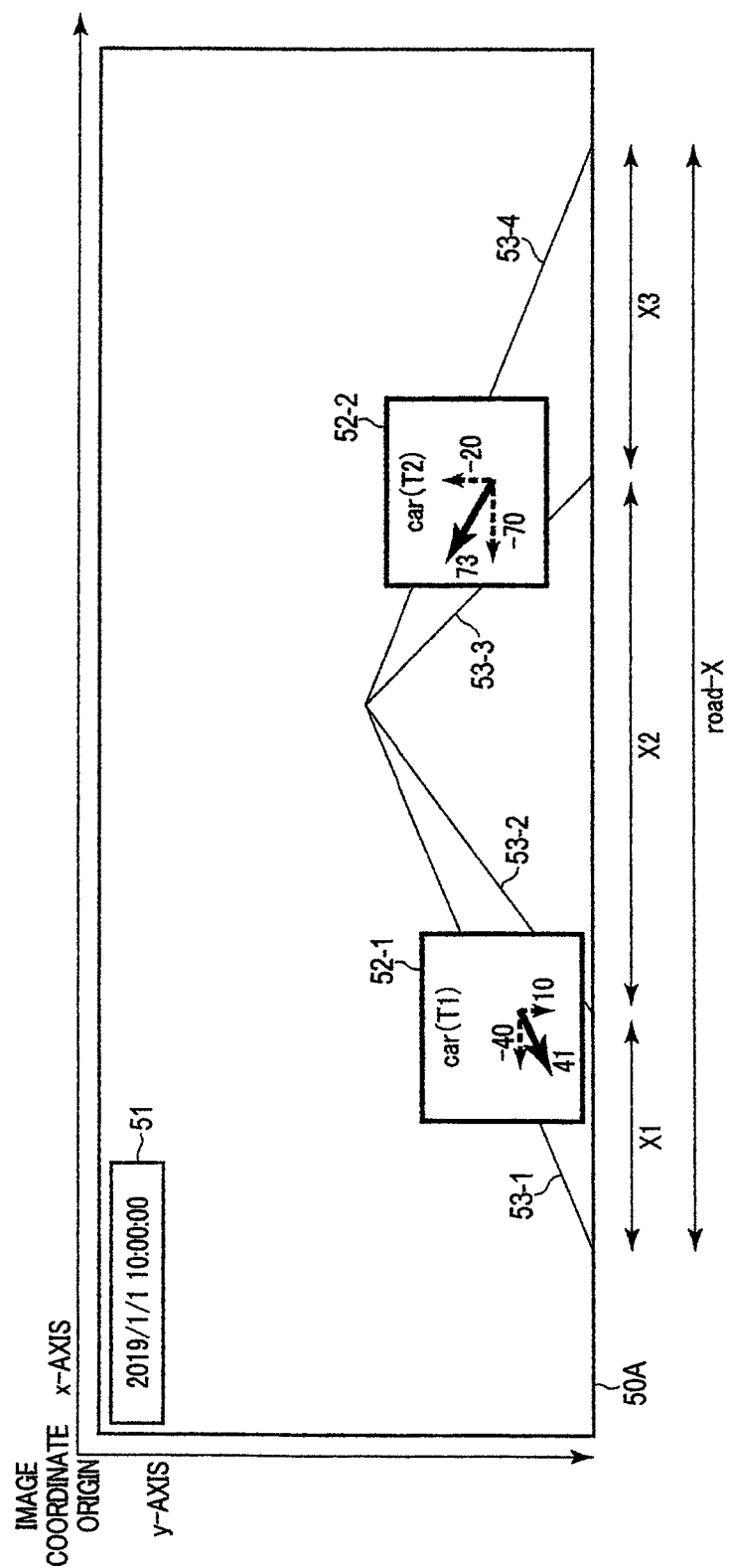
FIG. 16 is a diagram illustrating an example of an analysis image of the data illustrated in FIG. 15.

FIG. 16 is a diagram illustrating an example of an image of the road-specific data illustrated in FIG. 15. The ID of the road on which the own vehicle travels is set to X (road-X), and when the road is a three-lane road, the lanes are set as X1, X2, and X3 from the left in the traveling direction. In this case, the lane ID in which the own vehicle travels can be identified by the traveling road identification unit 25, and the lane ID in which another vehicle is located can also be identified by the processing performed by the area determination unit 24. The road-specific information storage unit 33 may store the area of another vehicle obtained by the processing performed by the area determination unit 24 in a format in which it is associated with the lane ID. Note that in FIG. 16, the direction of the arrow indicative of the moving amount may show that the vehicle (T1) detected as the rectangle 52-1 is traveling in the lane for the same traveling direction as the own vehicle while the vehicle (T2) detected as the rectangle 52-2 is traveling in the lane for the opposite traveling direction to the own vehicle. Note that the numerical value in each rectangle 52 represents a change in coordinates.

(7) Traffic Flow Calculation Processing

Subsequently, in step S7, under the control of the control unit 20 in the traffic flow estimation apparatus 1, the traffic flow calculation unit 26 performs traffic flow calculation processing.

Figure 17:
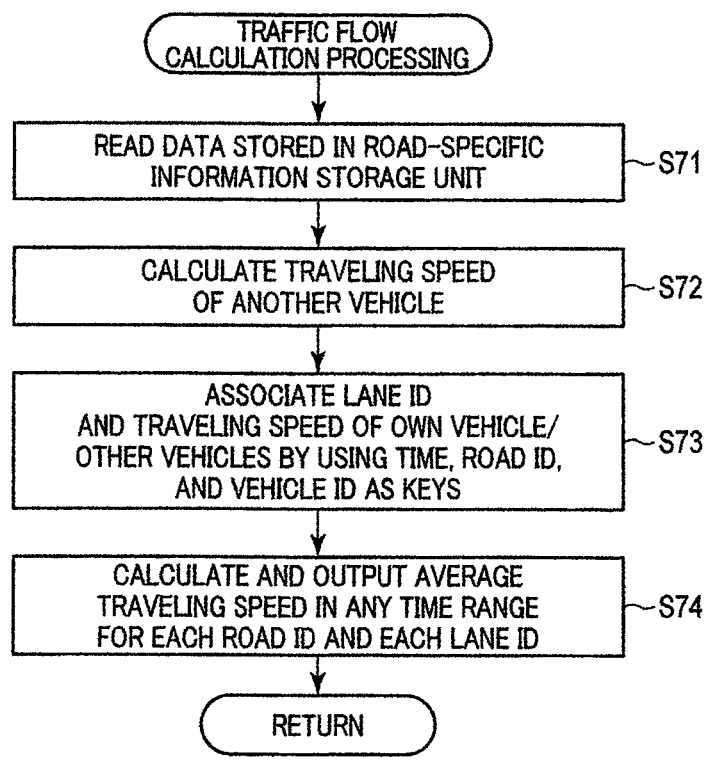
FIG. 17 is a flowchart illustrating processing procedure and processing content of traffic flow calculation processing of the steps of processing illustrated in FIG. 4.

FIG. 17 is a flowchart illustrating an example of processing procedure and processing content of the traffic flow calculation processing in step S7.

First, in step S71, the traffic flow calculation unit 26 reads the data stored in the road-specific information storage unit 33.

Next, in step S72, the traffic flow calculation unit 26 calculates the traveling speeds of the other vehicles 7 from the traveling speed of the own vehicle 6 and the moving amount information of the other vehicles 7 in the read data.

In calculating the traveling speeds of the other vehicles 7, the traffic flow calculation unit 26 can generate training data in advance and then calculate the traveling speeds by using a regression model. Specifically, a regression analysis is performed in which the traveling speed of the own vehicle 6 and the moving amount information of the other vehicles 7 are used as explanatory variables and the traveling speeds of the other vehicles 7 are used as objective variables, so that a coefficient vector for each explanatory variable vector can be estimated. The regression analysis model may be, for example, a linear combination model, and where X is an explanatory variable vector, W is a coefficient vector corresponding to the explanatory variable vector, and Y is an objective variable, W can be calculated such that the inner product of X and W is nearest to Y by using the least squares method or the like. Thereafter, using the calculated coefficient vector W makes it possible to estimate the traveling speed of unknown another vehicle 7 when the traveling speed of the own vehicle 6 and the moving amount information of the other vehicle 7 are obtained.

FIG. 18A illustrates an example of an image of the training data used for constructing the regression model as described above. The training data may be, for example, generated based on actual measurement data or generated based on simulation results. FIG. 18B illustrates an example of an image of the coefficient vector W obtained by the regression analysis as described above.

Next, in step S73, the traffic flow calculation unit 26 performs processing of associating lane IDs of lanes in which the own vehicle and other vehicles are traveling and traveling speeds by using time, road ID, and lane ID as keys. FIG. 19 illustrates an example of an image of such a processing result. R01 indicates information on the own vehicle 6, and R02 indicates information on the other vehicles 7 detected from the own vehicle 6. In an example, the traffic flow calculation unit 26 associates the speed of a traveling vehicle for each set of time, road, and lane. Here, it is not necessary to identify the own vehicle and the other vehicles.

Next, in step S74, the traffic flow calculation unit 26 calculates an average value (average speed (km/h)) of traveling speeds in a time range for each road ID and each lane ID, and outputs the calculation result to the traffic flow information storage unit 34 to store it. The time range for calculating a traffic flow may be any range such as 10-minute units and 30-minute units. The traffic flow calculation unit 26 divides the data for each of the determined time range, road ID, and lane ID, and then calculates the average value of the traveling speeds included in the data, so that a traffic flow for each lane in a time zone can be calculated. Note that it is not always necessary to be an average value, and any statistic such as a median value or a deviation may be calculated depending on the purpose of use.

Further, when the number of data records is extremely small or the number of records reaches 0 as a result of dividing the data for each of the determined time range, road ID, and lane ID, the traffic flow calculation unit 26 may use information on time ranges before and after that time range to perform interpolation. Alternatively, when the traffic flow calculation unit 26 successfully obtains a traffic flow for each lane of a plurality of lanes for any time range, the traffic flow calculation unit 26 can also calculate a correlation between the lanes and then perform interpolation from the average speed for the adjacent lane. For example, if the speed ratio between the first lane and the second lane is 1:1.2, the traffic flow calculation unit 26 may multiply the average speed calculated for the first lane by 1.2 to obtain the average speed for the second lane for interpolation. Alternatively, if the average speeds can be calculated for 10:00-10:30 and 11:00-11:30 in the time range while the average speed cannot be calculated for 10:30-11:00, the traffic flow calculation unit 26 may perform interpolation such that an average value of the average speeds 10:00-10:30 and 11:00-11:30 is used for the average speed for 10:30-11:00. By performing interpolation, the traffic flow estimation apparatus 1 can calculate the traffic flow for each lane from a smaller amount of vehicle data.

The traffic flow calculation unit 26 stores the average speeds (km/h) calculated in this way in the traffic flow information storage unit 34.

FIG. 20 illustrates an example of a data image stored in the traffic flow information storage unit 34. The example indicated in FIG. 20 includes average speeds calculated with a time range of 30 minutes.

(8) Output of Traffic Flow

In step S8, in the traffic flow estimation apparatus 1, the output control unit 27 performs some output processing. The output control unit 27 reads out the information stored in the traffic flow information storage unit 34, for example, periodically or in response to a transmission request from the vehicle 6 or an output request from the operator input via the input device 2, generates data for output, and outputs the data via the communication interface 11 or the input/output interface 12.

For example, in a case where the traffic flow estimation apparatus 1 is an apparatus installed in a traffic control center and the output device 3 is a liquid crystal display installed in the traffic control center, the output control unit 27 can display the average speed (traffic flow) calculated for each set of time range, road ID, and lane ID to the liquid crystal display via an input/output interface unit to display it, based on information read from the traffic flow information storage unit 34 at certain time intervals such as 5 min, 10 min, or 30 min. Then, the operator of the traffic control center who sees this display can immediately grasp the road conditions in streets such as traffic congestion information and take appropriate measures.

(Effects)

As described in detail above, the traffic flow estimation apparatus 1 according to the embodiment of the present invention acquires camera video data and sensor data collected by the vehicle 6 traveling on a road, detects the other vehicles 7 from the image of each frame included in the camera video data, calculates moving amounts of the other vehicles 7 and the like, and estimates which lane on the road the other vehicle 7 is traveling with respect to the traveling position of the vehicle 6. The traffic flow estimation apparatus 1 also identifies the road and the lane where vehicle 6 is traveling from the sensor data (and the camera video data, optionally). Then, the traffic flow estimation apparatus 1 calculates the speeds of the other vehicles 7 based on the speed of the vehicle 6, the road and lane where the vehicle 6 is traveling, the moving amounts of the other vehicles 7, and the estimated lanes in which the other vehicles 7 are traveling, and thus calculates a traffic flow for each lane.

In this way, the traffic flow estimation apparatus 1 can calculate not only the lane in which the vehicle (own vehicle) 6 from which the camera video data and the sensor data are collected is traveling, but also the traffic flow of other lanes, and thus calculate a traffic flow in a wider range (lane) from less vehicle data. For example, even in a situation where vehicle data can be collected only from vehicles traveling in one or some lanes among vehicles traveling on a certain road, the traffic flow estimation apparatus 1 can estimate a traffic flow in each lane. In addition, this makes it possible to estimate the traffic flow by effectively utilizing the limited data while suppressing the traffic between the vehicle and the traffic flow estimation apparatus 1.

Further, the traffic flow estimation apparatus 1 is configured to detect another vehicle 7 appearing in video data of the view in front of the traveling vehicle 6, and when the moving amount of the other vehicle 7 is calculated, cause the moving amount calculation unit 23 to associate vehicles in frames. As a result, the traffic flow estimation apparatus 1 can calculate the moving amount more accurately than in the case where the association is not performed, so that the traffic flow can be calculated more accurately.

The traffic flow estimation apparatus 1 also detects the other vehicle 7 appearing in the video data of the view in front of the traveling vehicle 6, calculates the moving amount of the other vehicle 7, and then automatically determine the area of which lane on which road that vehicle is traveling in. The area determination unit 24 that performs such area determination determines the area of one right lane and one left lane with respect to the lane in which the own vehicle 6 is traveling in the in-image coordinate system in the video (image) data, determines whether or not other vehicle(s) 7 is in the area, so that it is possible to determine which lane the other vehicle 7 is traveling in. As a result, the traffic flow estimation apparatus 1 can calculate a traffic flow of the adjacent lane from the vehicle data of the vehicle 6 traveling in a certain lane.

Further, when determining which lane the other vehicle 7 is traveling in, the area determination unit 24 uses not only the moving amount of the other vehicle 7 but also the moving direction of the other vehicle 7 in the image coordinate system. By using the moving direction, the area determination unit 24 can automatically determine whether the lane in which the other vehicle 7 is traveling is, for example, one right lane or two or more lane to the right with respect to the lane in which the own vehicle is traveling. As a result, the traffic flow estimation apparatus 1 can calculate a traffic flow of the adjacent lane in a wide range from the vehicle data of the vehicle 6 traveling in a certain lane.

Further, the traffic flow estimation apparatus 1 detects another vehicle 7 appearing in the video data of the view in front of the traveling vehicle 6, and estimates the moving amount and the relative traveling position of the other vehicle 7, so that it is possible to calculate a traffic flow of another lane other than the lane in which the own vehicle 6 is traveling. The traffic flow calculation unit 26 that calculates the traffic flow can estimate a relative speed such as that the other vehicle 7 is faster than, the same as, or slower than the traveling speed of the own vehicle 6.

Further, when the traveling speed of the other vehicle 7 is successfully collected as vehicle data, the traffic flow calculation unit 26 accumulates the traveling speeds of the other vehicles 7, the moving amounts of the other vehicles 7 calculated by the moving amount calculation unit 23, and the traveling speed of the own vehicle 6 when the other vehicles 7 are detected in association with one another, and formulates the relationships between the moving amounts of the other vehicles and the speed differences (relative speeds) between the own vehicle and the other vehicles, so that it is possible to quantitatively calculate the relative speed difference from the traveling speed of the own vehicle 6 for a given moving amount of a certain other vehicle 7. Therefore, the traffic flow estimation apparatus 1 can calculate a more accurate traffic flow of the adjacent lane from the vehicle data obtained from the vehicle 6 traveling in a certain lane.

The traffic flow estimation apparatus 1 extracts the relative movement (change in relative position) of another vehicle 7 as a moving amount, converts the moving amount into a speed, and then calculates a traffic flow. Therefore, the traffic flow estimation apparatus 1 can similarly calculate the speed of an oncoming vehicle traveling in the opposite lane, and can be applied to traffic flow calculation for the opposite lane.

Other Embodiments

Note that the present invention is not limited to the above embodiments. For example, the functional units included in the traffic flow estimation apparatus 1 may be distributed to and deployed in a plurality of apparatuses, and the processing may be performed by coordinating these apparatuses with each other. Further, each functional unit may be realized by using a circuit. The circuit may be a dedicated circuit that implements a specific function, or may be a general-purpose circuit such as a processor.

The road-specific information storage unit 33 has been described as being a unit that combines the data output by the area determination unit 24 and the data output by the traveling road identification unit 25 and stores the resulting data. However, the road-specific information storage unit 33 is not limited to this, and the road-specific information storage unit 33 may be configured as two or more separate storage units.

The traffic flow estimation apparatus 1 has been described as being an apparatus that acquires camera video data, GPS data, and speed data as vehicle data. However, the traffic flow estimation apparatus 1 is not limited to this, and the traffic flow estimation apparatus 1 may also acquire other CAN data. For example, the traffic flow estimation apparatus 1 may be configured to additionally acquire acceleration data and angular velocity data and use them as an auxiliary for improving the accuracy of area determination or traveling road identification, or to additionally acquire control information such as brakes, steering, and the like and use it to estimate the speed of another vehicle 7 or a traffic flow.

Further, the traffic flow estimation apparatus 1 does not need to use only GPS data to obtain position information, may estimate position information based on speed information and control information, or may identify a traveling road or a traveling lane by using information obtained by road-to-vehicle communication with a roadside machine. Further, the traffic flow estimation apparatus 1 may use not only latitude and longitude but also altitude (elevation) data for estimating various information.

The moving amount calculation unit 23 may use another method for determining whether or not the vehicles 7 detected in frames are identical. For example, the text information of the license plates of vehicles appearing in each frame may be read to associate the vehicles based on the read character information. Alternatively, the identity of the vehicles may be detected through inter-vehicle communication with BLE (Bluetooth Low Energy) beacon or the like.

The traffic flow estimation apparatus 1 can calculate a traffic flow based on any data range. For example, the traffic flow estimation apparatus 1 may be configured to extract only the data that matches a specific condition from among the accumulated camera video data and sensor data and use it for calculating the traffic flow.

Furthermore, the flow of each processing described above is not limited to the procedure described above, and the order of some steps may be changed, or some steps may be performed in parallel. Further, the series of processing described above need not be performed sequentially in time, each step may be performed at any timing. For example, the steps for identifying the road or lane where the own vehicle is traveling described in terms of step S6 are not limited to the order illustrated in the drawing, and can also be performed, for example, before steps S3 to S5 or in parallel with steps S3 to S5. Further, the vehicle 6 itself may identify the traveling road or the traveling lane while the traffic flow estimation apparatus 1 may acquire road identification information identified by the vehicle 6 together with vehicle data.

The method described above can be stored as a computer-executable program (software means) in a recording medium (storage medium) such as a magnetic disk (floppy (registered trademark) disk, hard disk, etc.), an optical disk (CD-ROM, DVD, MO, etc.), and a semiconductor memory (ROM, RAM, flash memory, etc.), and be transmitted and distributed by a communication medium. Note that the program stored on the medium side also includes a setting program for configuring the computer-executable software means (including not only an execution program but also a table and data structure) in the computer. The computer that realizes the above-mentioned apparatus reads the program recorded on the recording medium, constructs the software means by the setting program in some cases, and executes the above-described steps of processing by the software means controlling the operation. Note that the recording medium referred to in the present description is not limited to one for distribution, and includes a storage medium such as a magnetic disk and a semiconductor memory provided in devices inside the computer or connected via a network.

In short, the present invention is not limited to the above-described embodiments, and can be variously modified at the implementation stage without departing from its spirit and scope. In addition, the embodiments may be performed in combination as appropriate, in which case a combined effect can be obtained. Further, the above-described embodiments include various inventions, and various inventions can be extracted by a combination selected from a plurality of disclosed components/elements. For example, even if some components/elements are deleted from all the components/elements described in the embodiments, the configuration with the components/elements being deleted can be extracted as the invention as long as the problem is solved and the effect is obtained.

(Notes)

Some or all of the above embodiments can be described as, but not limited to, in the following notes in addition to the claims.

[C1]

A traffic flow estimation apparatus (1) configured to implement:

a storage medium (30) that stores lane information of a target area whose traffic flow is to be estimated; a data acquisition unit (21) that acquires moving object data that includes a plurality of images and position information and speed information, the plurality of images being captured at a plurality of different timings by a first moving object (6) that is in motion in the target area and including a second moving object (7) around the first moving object (6), the position information and speed information being of the first moving object (6) at the timings; a first lane estimation unit (25) that identifies a lane in which the first moving object (6) is in motion based on the lane information stored in the storage medium and the position information of the first moving object (6) included in the acquired moving object data; a change amount calculation unit (23) that calculates, based on the images included in the moving object data, information indicative of a change over time of positions of the second moving object (7) in the images; a second lane estimation unit (24) that detects a positional relationship of the second moving object (7) with respect to the first moving object (6) from the images included in the moving object data to estimate a lane in which the second moving object (7) is in motion based on the positional relationship and the estimated lane in which the first moving object (6) is in motion; and a traffic flow calculation unit (26) that calculates a traffic flow for each lane in the target area based on the speed information of the first moving object (6) included in the moving object data, the information indicative of a change over time of positions of the second moving object (7), and the estimated lanes in which the first moving object (6) and the second moving object (7) are in motion.

[C2]

The traffic flow estimation apparatus (1) according to C1, wherein the change amount calculation unit (23) determines identity among second moving objects (7) included in the plurality of images by comparing the plurality of images, and when the second moving objects (7) are determined to be identical, calculates the information indicative of a change over time of positions of the second moving object (7).

[C3]

The traffic flow estimation apparatus (1) according to C1, wherein the second lane estimation unit (24) sets, in the images included in the moving object data, a lane determination line representing a lane in which the first moving object is in motion; and estimates a lane in which the second moving object (7) is in motion based on the set lane determination line and the positional relationship of the second moving object (7) with respect to the first moving object (6).

[C4]

The traffic flow estimation apparatus (1) according to C1, wherein the change amount calculation unit (23) calculates a moving direction of the second moving object (7) based on a change in in-image coordinates of the second moving object (7) included in the plurality of images to calculate the information indicative of a change over time of positions of the second moving object (7), and the second lane estimation unit (24) estimates a lane in which the second moving object (7) is in motion based on the calculated moving direction and the estimated lane in which the first moving object (6) is in motion.

[C5]

The traffic flow estimation apparatus (1) according to C1, wherein the change amount calculation unit (23) calculates a moving amount of the second moving object (7) based on a change in in-image coordinates of the second moving object (7) included in the plurality of images to calculate the information indicative of a change over time of positions of the second moving object (7), and the traffic flow calculation unit (26) calculates a speed of the second moving object (7) by using a regression model in advance obtained by a regression analysis in which, based on the speed information of the first moving object (6) included in the moving object data and the calculated moving amount of the second moving object (7), the speed of the first moving object (6) and the moving amount of the second moving object (7) are used as explanatory variables and the speed of the second moving object (7) is used as an objective variable, to estimate the traffic flow of the lane in which the second moving object (7) is in motion.

[C6]

The traffic flow estimation apparatus (1) according to C1, wherein the traffic flow calculation unit (26) generates traffic data in which the information indicative of a change over time of positions of the second moving object (7) and the speed information of the first moving object (6) are associated with each other, divides the generated traffic data by using a predetermined reference to perform a necessary interpolation, and calculates a traffic flow of the target area based on the divided traffic data subjected to the necessary interpolation and the lane in which the first moving object (6) is in motion.

[C7]

A traffic flow estimation method performed by a traffic flow estimation apparatus that includes a memory storing lane information of a target area whose traffic flow is to be estimated and a processor, the traffic flow estimation method including: a step (S2) of acquiring, by the processor, moving object data that includes a plurality of images and position information and speed information, the plurality of images being captured at a plurality of different timings by a first moving object (6) that is in motion in the target area and including a second moving object (7) around the first moving object (6), the position information and speed information being of the first moving object (6) at the timings; a step (S6) of identifying, by the processor, a lane in which the first moving object (6) is in motion based on the lane information stored in the memory and the position information of the first moving object (6) included in the acquired moving object data; a step (S4) of calculating, by the processor, based on the images included in the moving object data, information indicative of a change over time of positions of the second moving object (7) in the images; a step (S5) of detecting, by the processor, a positional relationship of the second moving object (7) with respect to the first moving object (6) from the images included in the moving object data to estimate a lane in which the second moving object (7) is in motion based on the positional relationship and the estimated lane in which the first moving object (6) is in motion; and a step (S7) of calculating, by the processor, a traffic flow for each lane in the target area based on the speed information of the first moving object (6) included in the moving object data, the information indicative of a change over time of positions of the second moving object (7), and the estimated lanes in which the first moving object (6) and the second moving object (7) are in motion.

[C8]
A program that causes a processor to execute processing performed by the units of the traffic flow estimation apparatus (1) according to any one of [C1] to [C6].

REFERENCE SIGNS LIST

1 Traffic flow estimation apparatus
2 Input device
3 Output device
6 First moving object, own vehicle
7 Second moving object, other vehicle
8 Lane boundary
9 Lane
11 Communication interface
12 Input/output interface
20 Control unit
20A Hardware processor
20B Program memory
21 Vehicle data acquisition unit
22 Vehicle detection unit
23 Moving amount calculation unit
24 Area determination unit
25 Traveling road identification unit
26 Traffic flow calculation unit
27 Output control unit
30 Data memory
31 Vehicle data storage unit
32 Road network data storage unit
33 Road-specific information storage unit
34 Traffic flow information storage unit
40 Bus
50 Frame
51 Date and time information
52 Rectangle
53 Area determination line, lane determination line
61 In-vehicle camera
62 Sensor
63 In-vehicle device

The invention claimed is:
1. A traffic flow estimation apparatus comprising:
a hardware processor; and
a memory,
wherein the memory includes a storage unit that stores lane information of a target area whose traffic flow is to be estimated, and the hardware processor is configured to perform:
acquiring moving object data that includes a plurality of images and position information and speed information, the plurality of images being captured at a plurality of different timings by a first moving object that is in motion in the target area and including a second moving object around the first moving object, the position information and speed information being of the first moving object at the timings;
identifying a lane in which the first moving object is in motion based on the lane information stored in the storage unit and the position information of the first moving object included in the acquired moving object data;
calculating, based on the images included in the moving object data, information indicative of a change over time of positions of the second moving object in the images;
detecting a positional relationship of the second moving object with respect to the first moving object from the images included in the moving object data to estimate a lane in which the second moving object is in motion based on the positional relationship and the estimated lane in which the first moving object is in motion; and
estimating a traffic flow for each lane in the target area based on the speed information of the first moving object included in the moving object data, the information indicative of a change over time of positions of the second moving object, and the estimated lanes in which the first moving object and the second moving object are in motion.

2. The traffic flow estimation apparatus according to claim 1, wherein calculating the information indicative of a change over time of positions of the second moving object includes determining identity among second moving objects included in the plurality of images by comparing the plurality of images.

3. The traffic flow estimation apparatus according to claim 1, wherein estimating the lane in which the second moving object is in motion includes setting, in the images included in the moving object data, a lane determination line representing a lane in which the first moving object is in motion; and estimating a lane in which the second moving object is in motion based on the set lane determination line and the positional relationship of the second moving object with respect to the first moving object.

4. The traffic flow estimation apparatus according to claim 1, wherein calculating the information indicative of a change over time of positions of the second moving object includes calculating a moving direction of the second moving object based on a change in in-image coordinates of the second moving object included in the plurality of images, and estimating a lane in which the second moving object is in motion includes estimating a lane in which the second moving object is in motion based on the calculated moving direction and the estimated lane in which the first moving object is in motion.

5. The traffic flow estimation apparatus according to claim 1, wherein calculating the information indicative of a change over time of positions of the second moving object includes calculating a moving amount of the second moving object based on a change in in-image coordinates of the second moving object included in the plurality of images, and estimating the traffic flow includes calculating a speed of the second moving object by using a regression model obtained in advance by a regression analysis in which, based on the speed information of the first moving object included in the moving object data and the calculated moving amount of the second moving object, the speed of the first moving object and the moving amount of the second moving object are used as explanatory variables and the speed of the second moving object is used as an objective variable.

6. The traffic flow estimation apparatus according to claim 1, wherein estimating the traffic flow includes generating traffic data in which the information indicative of a change over time of positions of the second moving object and the speed information of the first moving object are associated with each other; dividing the generated traffic data by using a predetermined reference to perform a necessary interpolation; and estimating a traffic flow of the target area based on the divided traffic data subjected to the necessary interpolation and the lane in which the first moving object is in motion.

7. A traffic flow estimation method performed by a traffic flow estimation apparatus, the traffic flow estimation method comprising:
- acquiring moving object data that includes a plurality of images, position information, and speed information, the plurality of images being captured at a plurality of different timings by a first moving object that is in motion in a target area whose traffic flow is to be estimated and including a second moving object around the first moving object, the position information and the speed information being of the first moving object at the timings;
- identifying a lane in which the first moving object is in motion based on lane information of the target area and the position information of the first moving object included in the acquired moving object data;
- calculating, based on the images included in the moving object data, information indicative of a change over time of positions of the second moving object in the images;
- detecting a positional relationship of the second moving object with respect to the first moving object from the images included in the moving object data to estimate a lane in which the second moving object is in motion based on the positional relationship and the estimated lane in which the first moving object is in motion; and
- estimating a traffic flow for each lane in the target area based on the speed information of the first moving object included in the moving object data, the information indicative of a change over time of positions of the second moving object, and estimated lanes in which the first moving object and the second moving object are in motion.

8. A non-transitory tangible computer-readable storage medium storing a program for causing a hardware processor to execute:
- causing a memory to store lane information of a target area whose traffic flow is to be estimated;
- acquiring moving object data that includes a plurality of images and position information and speed information, the plurality of images being captured at a plurality of different timings by a first moving object that is in motion in the target area and including a second moving object around the first moving object, the position information and speed information being of the first moving object at the timings;
- identifying a lane in which the first moving object is in motion based on the lane information stored in the memory and the position information of the first moving object included in the acquired moving object data;
- calculating, based on the images included in the moving object data, information indicative of a change over time of positions of the second moving object in the images;
- detecting a positional relationship of the second moving object with respect to the first moving object from the images included in the moving object data to estimate a lane in which the second moving object is in motion based on the positional relationship and the estimated lane in which the first moving object is in motion; and
- estimating a traffic flow for each lane in the target area based on the speed information of the first moving object included in the moving object data, the information indicative of a change over time of positions of the second moving object, and the estimated lanes in which the first moving object and the second moving object are in motion.

* * * * *